(12) United States Patent
Irwin, Jr. et al.

(10) Patent No.: US 8,434,791 B2
(45) Date of Patent: May 7, 2013

(54) LOTTERY TRANSACTION MECHANISMS

(76) Inventors: Kenneth E. Irwin, Jr., Dawsonville, GA (US); Mather Lindsay, Milton, GA (US); Gary R. Streeter, Andover, MA (US); Patricia M. Irwin, Dawsonville, GA (US)

( * ) Notice: Subject to any disclaimer, the term of this patent is extended or adjusted under 35 U.S.C. 154(b) by 266 days.

(21) Appl. No.: 12/657,407

(22) Filed: Jan. 20, 2010

(65) Prior Publication Data

US 2010/0181755 A1    Jul. 22, 2010

Related U.S. Application Data

(60) Provisional application No. 61/205,480, filed on Jan. 21, 2009, provisional application No. 61/209,470, filed on Mar. 9, 2009, provisional application No. 61/212,555, filed on Apr. 13, 2009, provisional application No. 61/271,020, filed on Jul. 16, 2009, provisional application No. 61/276,279, filed on Sep. 10, 2009, provisional application No. 61/283,379, filed on Dec. 3, 2009.

(51) Int. Cl.
*B42D 1/00* (2006.01)
*B42D 19/00* (2006.01)
*B42D 15/00* (2006.01)
*G09B 19/00* (2006.01)

(52) U.S. Cl.
USPC .......... 283/72; 281/2; 281/5; 283/49; 283/61; 283/67; 283/94; 283/100; 283/903

(58) Field of Classification Search .............. 281/2, 3.1, 281/5; 283/49, 61, 67, 72, 94, 100, 903
See application file for complete search history.

(56) References Cited

U.S. PATENT DOCUMENTS

| | | | | |
|---|---|---|---|---|
| 5,504,808 | A * | 4/1996 | Hamrick, Jr. ............... | 283/94 |
| 5,624,119 | A * | 4/1997 | Leake ............... | 283/49 |
| 6,875,105 | B1 | 4/2005 | Behm et al. ...... | 463/17 |
| 7,047,104 | B2 * | 5/2006 | Perin et al. ............... | 283/903 |
| 7,494,048 | B2 | 2/2009 | Gusler et al. ............ | 235/379 |
| 2001/0039511 | A1 | 11/2001 | Duckworth et al. ...... | 705/14 |
| 2002/0130510 | A1 * | 9/2002 | Thompson et al. ......... | 283/61 |
| 2004/0024700 | A1 * | 2/2004 | Petigny ............... | 705/39 |
| 2004/0176158 | A1 | 9/2004 | Baldwin ............... | 463/17 |
| 2004/0259626 | A1 | 12/2004 | Akram et al. ......... | 463/17 |
| 2005/0149393 | A1 | 7/2005 | Leof ............... | 705/14 |
| 2009/0194988 | A1 * | 8/2009 | Wright et al. .......... | 283/94 |

* cited by examiner

*Primary Examiner* — Dana Ross
*Assistant Examiner* — Justin V Lewis
(74) *Attorney, Agent, or Firm* — Michael B. McMurry

(57) ABSTRACT

Described are a number of mechanisms that can reduce transaction costs and increase the economic viability of a number of products. Included is a combination instant lottery ticket and debit card that makes it possible to issue prepaid debit cards having a relatively low monetary value. Also included is a combination on-line ticket/receipt and debit card that can automate the prize paying process, simplifying the retailer's responsibilities while reducing the potential for fraud. Various cash flow and authentication techniques such as age and location verification, nano payment methods and spam filters based on these mechanisms are also described. In addition, instant lottery tickets, and in particular, losing tickets can be provided with a small residual value by placing account information on the ticket. In another version, a lottery ticket can be combined with a payment card that operates as a closed payment system whereby the payment card can only be used with a specified vendor.

7 Claims, 16 Drawing Sheets

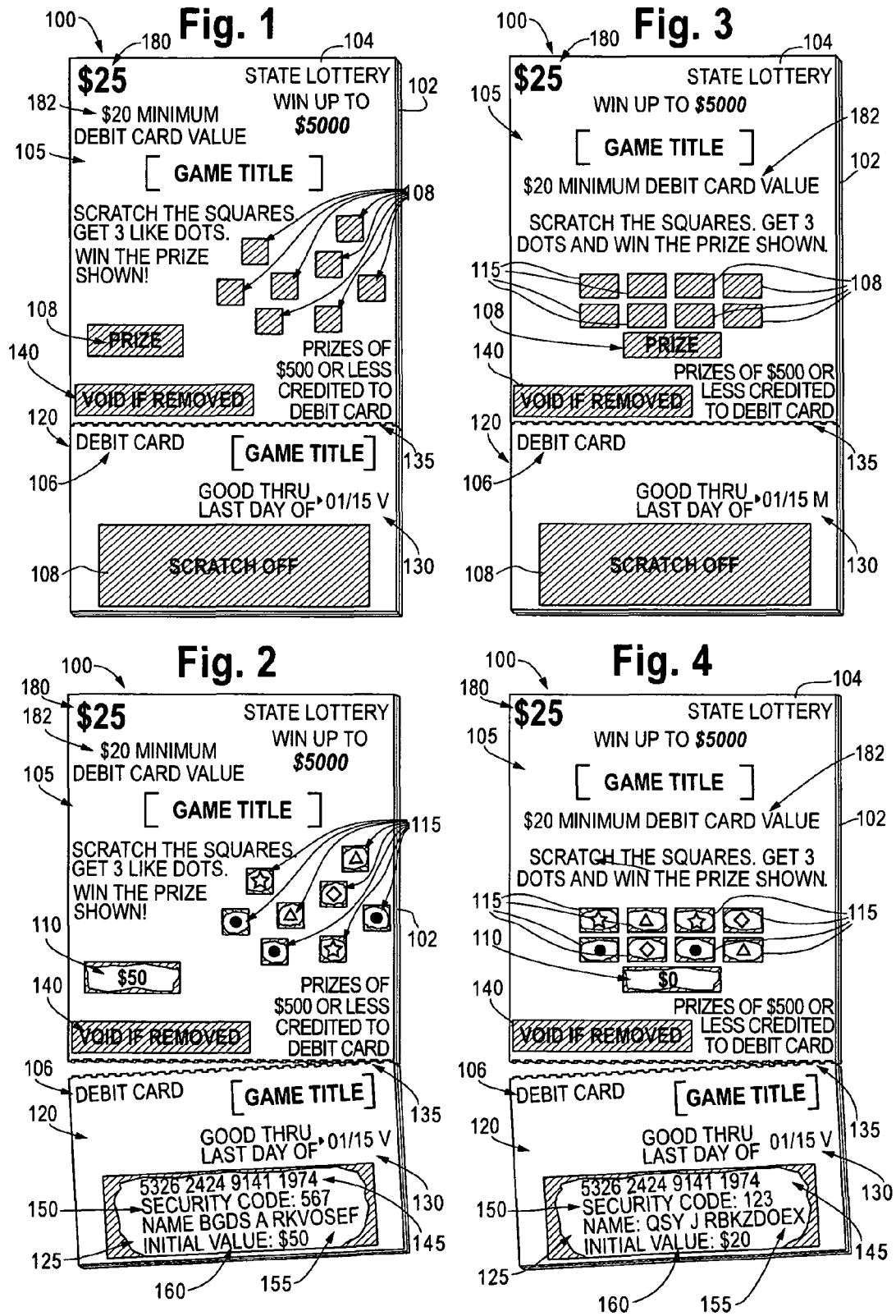

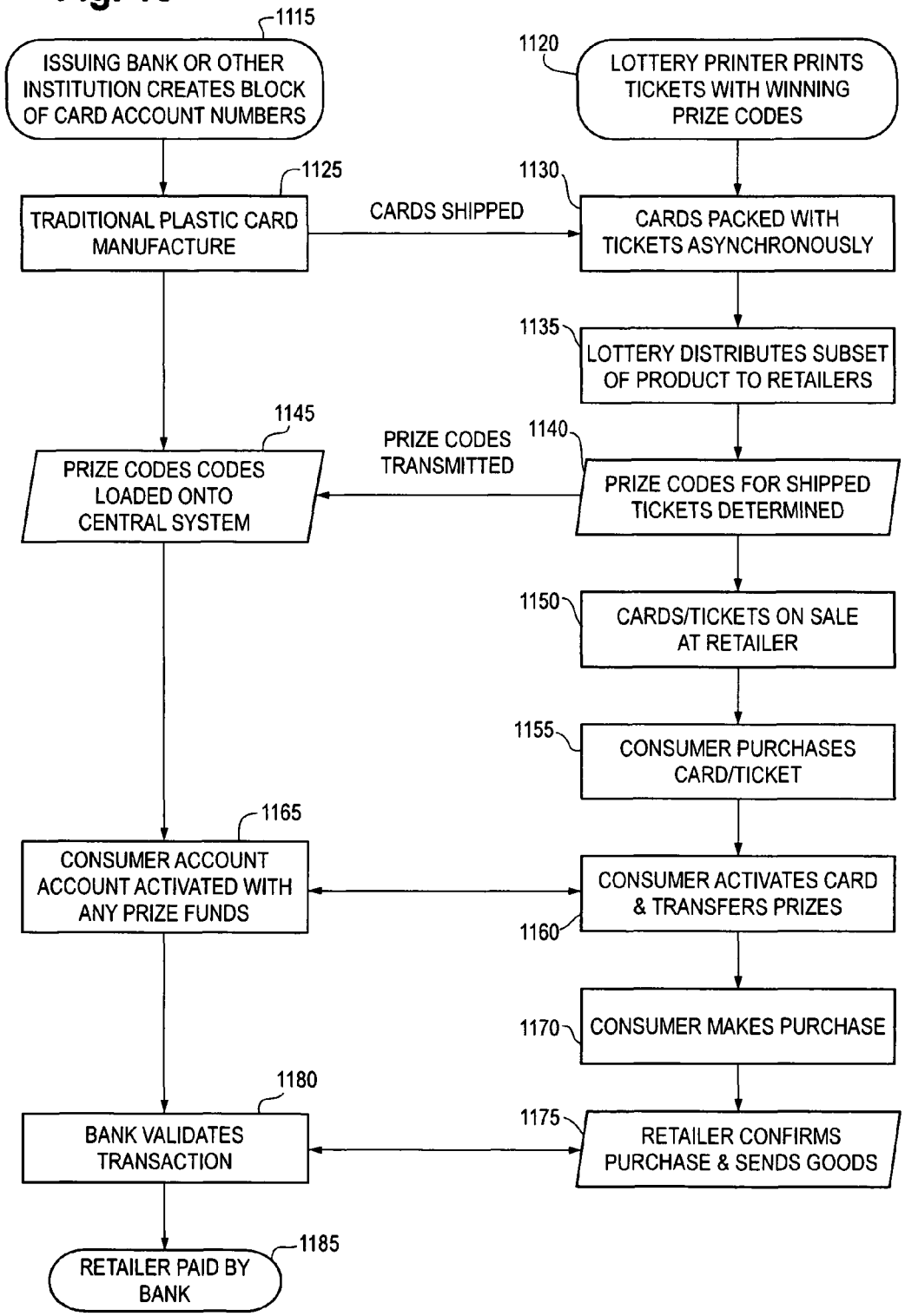

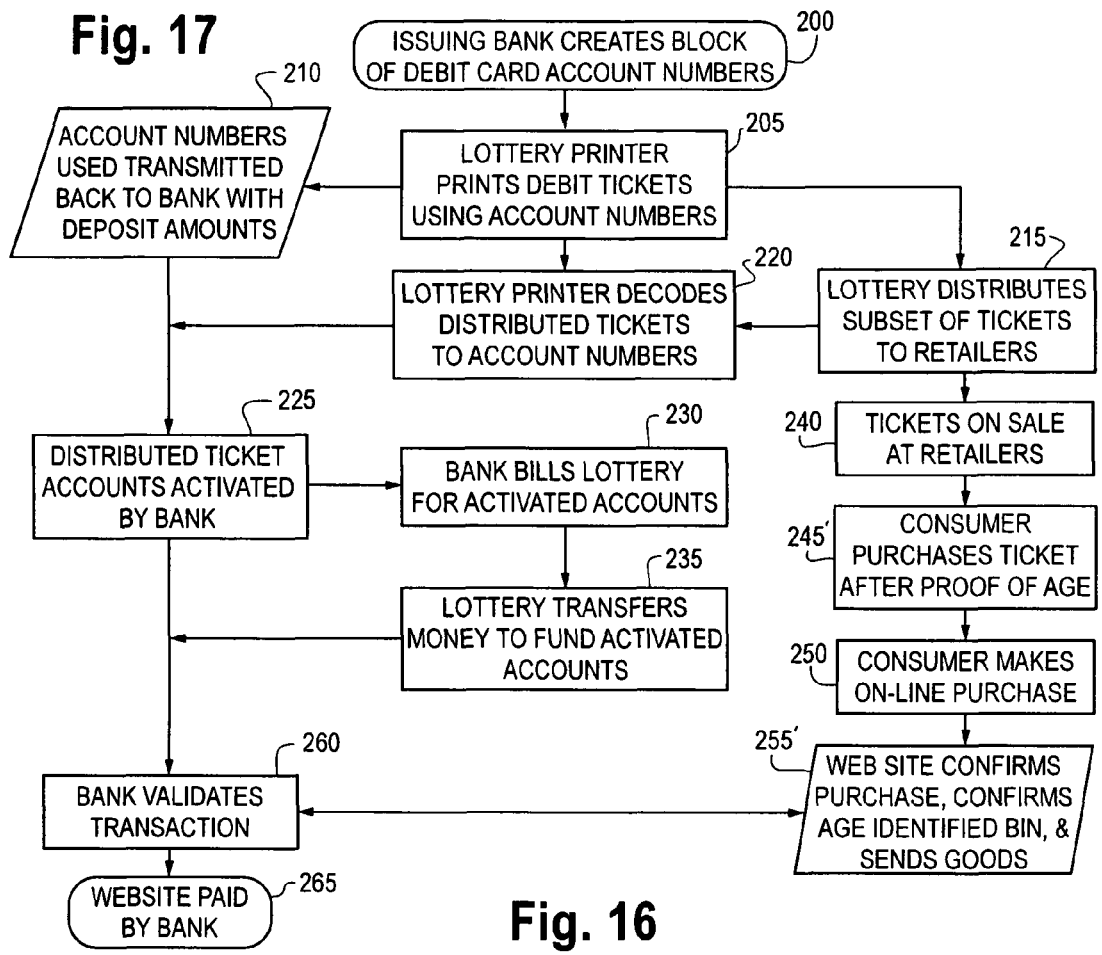
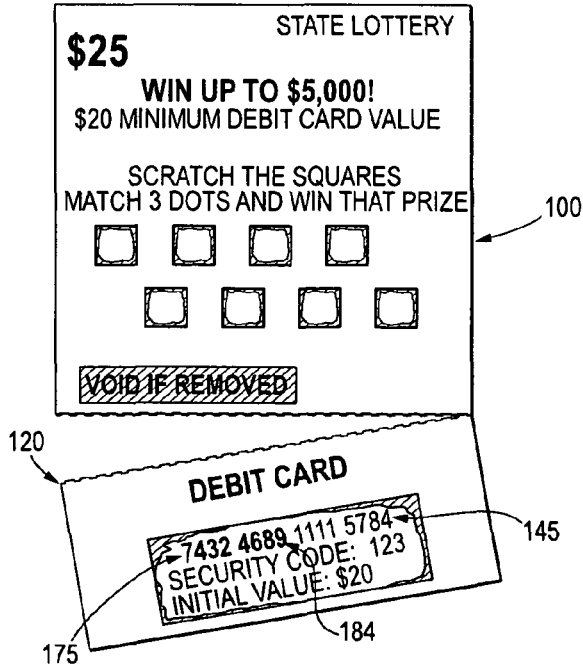

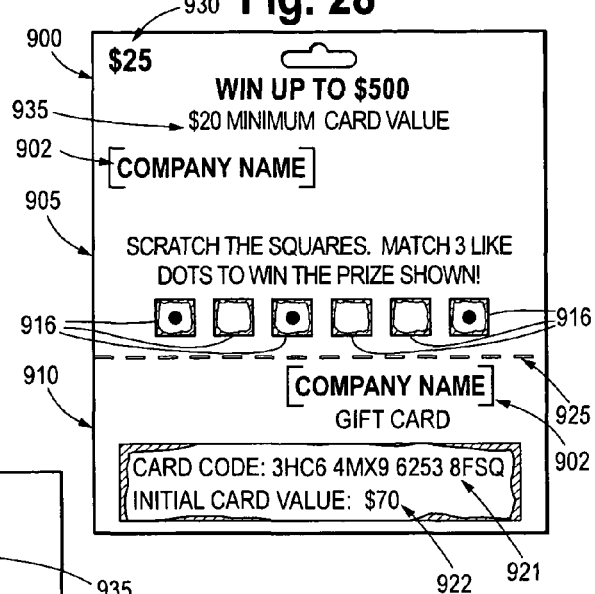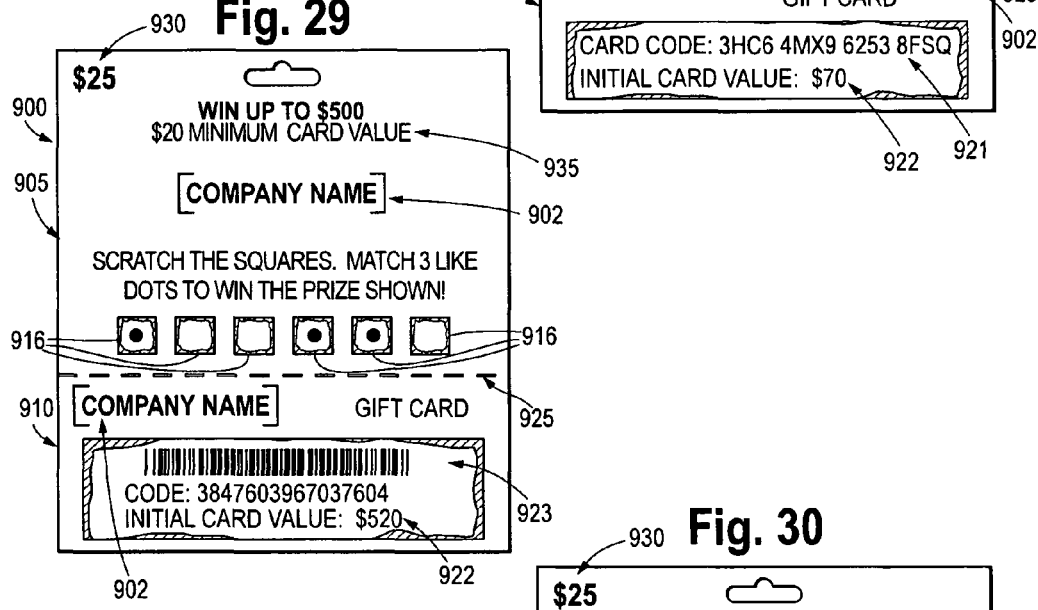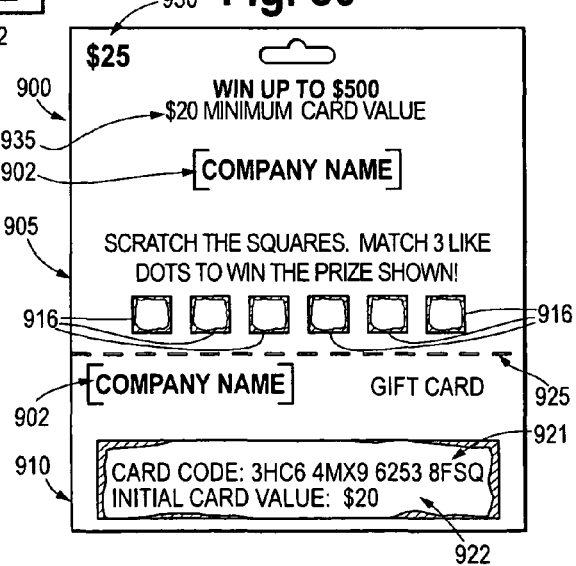

LOTTERY TRANSACTION MECHANISMS

CROSS-REFERENCE TO RELATED APPLICATIONS

This application claims priority on the following U.S. provisional patent applications: Ser. No. 61/205,480, Filed Jan. 21, 2009; Ser. No. 61/209,470, Filed Mar. 9, 2009; Ser. No. 61/212,555, Filed Apr. 13, 2009; Ser. No. 61/271,020, Filed Jul. 16, 2009; Ser. No. 61/276,279, Filed Sep. 10, 2009; and Ser. No. 61/283,379, Filed Dec. 3, 2009.

FIELD OF THE DESCRIBED SYSTEMS

The described transaction cards and methods relate generally to cards that can be used in on-line and web based transactions, as well as in-person and telephone transactions and more particularly to consumer purchased cards that can be used for multiple functions such as lottery tickets, sweepstakes, debit, or gift cards; in both open and closed looped payment systems.

BACKGROUND

Transaction costs are one of the problems associated with various consumer trade having relatively low monetary value. In the instant lottery industry, for example, the costs of redeeming winning lottery tickets involves a significant amount of retail clerical time along with the necessity of the retailer to finance the amount of low value, winning tickets with all the accounting activity that the redemption process requires. Moreover, for lottery games that have a large number of low value winners, for example, $5.00 to $25.00, the redemption costs can seriously discourage retailers from carrying this product.

Prepaid transaction cards such as debit cards are another example of the effect that transaction costs can have on the economics of these products. For low value debit cards, for example $20.00, the costs of issuing the cards as well as processing payments from these cards can make them economically impractical.

Micro or nano-payment systems provide further examples of the effects of transaction costs. One of the objects of a micro/nano-payment approach is to maintain and take advantage of a very high volume of web site viewers by offering content for a very low price. For example, a newspaper could make its articles available on-line for 5¢ or less. Other variations can include charging fractions of cents, that is, a smaller amount than the smallest possible amount of hard currency, for equally fractional amounts of content. One example involves charging a tenth of a cent for each web page in an online magazine. Another use would be to automatically charge, for instance, a tenth of a cent to send an electronic mail to a particular address. While this type of email charge system would be trivial for normal mail usage, it could seriously impact the economics of broadcast spam. However, most such applications are impractical from an economic standpoint due to transaction costs.

Establishing proof, that may be legally required, of age and location for certain types of transactions such as the purchase of alcohol or tobacco over the Internet as well as internet gaming can significantly increase the costs involved in such transactions.

Lottery related products such as the products described in U.S. Patent Publication Nos. US 2001/00395511, US 2004/0176158, 2004/0259626, and US 2005/0149393, especially using instant lottery tickets of the type described in U.S. Pat. No. 6,875,105, have not addressed the considerations discussed above.

SUMMARY

Described are a number of mechanisms that can reduce transaction costs and increase the economic viability of a number of products. One example is a product having its value based on a random event combined with or associated with a defined value instrument such as a debit, credit or gift card that makes it possible to issue prepaid debit cards that have a relatively low monetary value. Various cash flow and authentication techniques such as age verification and spam filters based on these mechanisms are also described.

BRIEF DESCRIPTION OF THE DRAWINGS

FIG. 1 is a front plan view of a first representative example of a combination instant lottery ticket debit/card having a low winning amount showing scratch-off coatings intact;

FIG. 2 is a front plan view of the first representative example of the combination instant lottery ticket/debit card of FIG. 1 showing the scratch-off coatings removed;

FIG. 3 is a front plan view of a second representative example of a combination instant lottery ticket/debit card having no winning amount showing scratch-off coatings intact;

FIG. 4 is a front plan view of the second representative example of the combination instant lottery ticket/debit card of FIG. 3 showing the scratch-off coatings removed;

FIG. 15 is a flow chart illustrating a method of producing, distributing, selling and using instant ticket/debit or gift cards of the type shown in FIGS. 12, 13 and 14;

FIG. 16 is a front plan view of a fourth representative example of a combination instant lottery ticket/debit card for use in age verification showing the scratch-off coatings removed;

FIG. 17 is a flow chart illustrating one method of producing, distributing, selling, and using the instant lottery ticket/debit cards of FIG. 16;

FIG. 28 is a front plan view of a second representative example of a combination instant lottery ticket payment card for use with a closed payment system with its scratch-off coating removed;

FIG. 29 is a front plan view of a third representative example of a combination instant lottery ticket payment card for use with a closed payment system with its scratch-off coating removed;

FIG. 30 is a front plan view of a fourth representative example of a combination instant lottery ticket payment card for use with a closed payment system;

DETAILED DESCRIPTION

Figure 5:
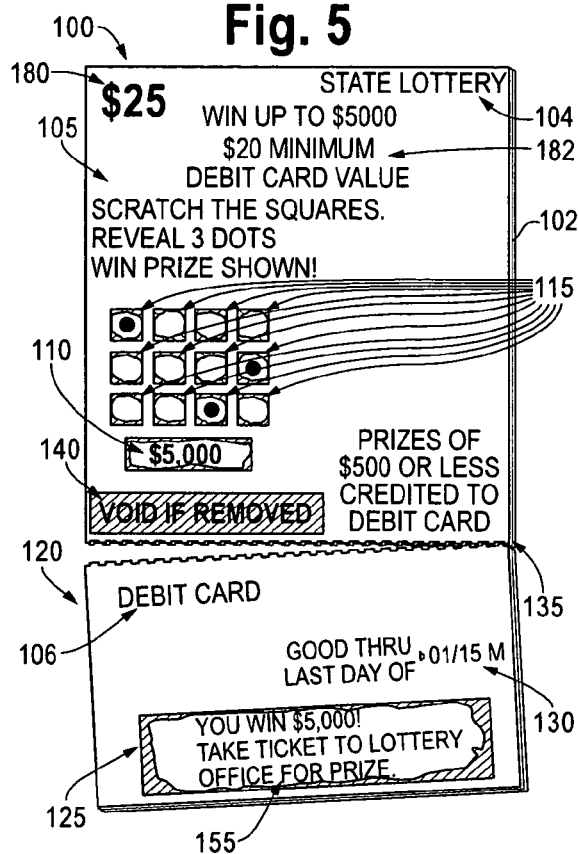
FIG. 5 is a front plan view of a third representative example of the combination instant lottery ticket/debit card having a high winning amount showing the scratch off coatings removed.

FIGS. 1 and 2 depict a first representative example of a defined value card having a value at least partially determined by a lottery event. The term defined value card is used herein to encompass cards or similar instruments such as debit cards, automated teller machine (ATM) cards, credit cards, or gift cards that can be used for purchase transactions and generally, in the case of debit and gift cards, have a predetermined or prepaid value. In the example of FIGS. 1 and 2 a card 100, printed on a paper substrate 102, includes two components: an instant lottery ticket 105 and with a defined value card 120, in this case a prepaid debit card. Methods of making instant lottery tickets are well known in the art as, for example, described in U.S. Pat. No. 6,875,105 which is incorporated herein by reference. Generally the term lottery instrument as used herein is intended to encompass the various instruments having a value not apparent to a consumer at the time the consumer acquires the instrument. The value can be based on random criteria or events such as: play indicia printed underneath a scratch-off coating on instant lottery tickets; on-line lottery tickets; lotto computer based outcomes; the outcomes of gaming machines; drawings; and the outcomes of future athletic contests. The instant lottery ticket 105 is provided as one embodiment of a suitable lottery instrument. Similarly, the debit card 120 is described herein as the preferred embodiment of a defined value card, but again it should be understood that other embodiments such as credit, gift or ATM cards are possible and might be more desirable under certain circumstances. Preferably, the lottery ticket portion 105 and the debit card portion 120 are identified as such by a display printing 104 and a display printing 106 respectively on the card 100. The instant lottery ticket/debit card embodiment 100 is used as an environment for describing the products, systems and methods presented below. In general, by combining an instant lottery ticket 105 and a prepaid debit card 120 on a single preprinted card 100 having the substrate 102, a hybrid product can be provided that can: lower costs to suppliers; reduce redemption costs to retailers; and provide consumers with an anonymous, secured, on-line payment vehicle at lower cost.

The hybrid product or printed card 100 can include: a removable Scratch-Off-Coating (SOC) 108 of the type that normally covers, as shown in FIG. 2, a set of printed instant lottery indicia, including: a prize value 110; a set of play indicia 115; and a void if removed indicia under the SOC 140 on the lottery ticket portion 105. Also, the SOC 108 in this embodiment covers a set of information indicated at 125 printed on the debit card portion 120 including: a debit card account number 145; an optional pseudorandomly assigned name 155; a Card ID (CID) or security code 150; and an amount 160 initially deposited on the card 120. Preferably the account number 145 serves as an identifier of an account in a payment institution. In this embodiment, the SOC 108 is intended to obscure the debit card information 125 until the purchaser of the product removes it. Here, the prepaid debit card 120 is attached to the instant lottery game ticket 105 that can be designed, produced, purchased, and played according to current accepted instant lottery business practices. As such, the hybrid instant ticket/debit card 100 can be distributed within existing distribution networks for instant lottery games. After playing the instant game as illustrated in FIG. 2, the consumer can remove the SOC 108 obscuring the debit card information 125 to confirm the total amount deposited in the debit card account printed at 160. In this example, removal of the SOC 108 over the information 125 will reveal the account number 145, the CID security code 150, the pseudorandomly assigned name 155, and the initial card value 160. This information 125 can supply the consumer with all of the information necessary to use the debit card 120 for standard debit card transactions. As with typical credit/debit/gift cards, the debit card 120 in this embodiment can include an expiration date 130 at which point the debit card would no longer be valid. For convenience, a perforation 135 can be added to the substrate 102 to aid the consumer in separating the debit card portion 120 from the scratch-off lottery ticket portion 105. Typically this separation would be done by the consumer after the instant ticket 105 is played.

In this embodiment, a purchase price of the instant ticket/debit card 100 as printed at 180 as display printing includes the lottery instant game and the prepaid debit card. For example, a $20 prepaid debit card 120 bundled with a $5 instant game ticket 105 could be sold for a total of $25. In FIG. 2, the ticket 105 is a winner as indicated, by the play indicia, a set of three dots, shown at 115. In addition, a prize amount is printed at 110. In this example, the debit card account balance 160 is the prize value shown at 110 rather than a $20 debit card minimum value 182 printed as display printing on the card 100. Alternatively, the amount won on the instant ticket can be added to the guaranteed minimum of the debit card 120; in this case, the amount shown at 160 would be $70, that is, $20 minimum debit card plus $50 winnings.

FIGS. 3 and 4 illustrate an example where the instant lottery ticket 105 is not a winner as indicated by the play indicia 115 in FIG. 4. Since the lottery ticket 105 is not a winner, the debit card 120 will have the base value of $20 as depicted at 182.

In these examples, preferably the retail sales price of the cards 100, including the prize structure and the non-prize component of the lottery game revenue, would be designed to cover the typical costs of the lottery game as well as the administrative costs of the debit cards. Thus, the economics of a lottery game can enable the typical transaction fees related to the issuance and use of the debit card 120 to be covered by the non-prize component of lottery game revenue.

FIG. 5 illustrates another embodiment of the card 100. While the hybrid instant ticket/debit card 100 can be an effective method of currency transfer for relatively small amounts of money, there are laws in various jurisdictions, for example money laundering, tax reporting, etc., that might limit its usage for larger amounts of currency, for example, amounts over $500. While it is possible to operate a hybrid instant ticket/debit card 100 lottery with the maximum prize not exceeding the legal limit for funds on an anonymous debit card such as the card 120, this might be undesirable under certain circumstances. Another approach, as illustrated in FIG. 5 where the play indicia 115 indicates at 110 that the winning amount is $5,000, is to permit high-tier winning tickets in excess of any legal limit for anonymous funds; but, to treat these cards 100 as special case conventional instant lottery tickets where the revealed debit card area 155 simply informs the consumer that a high tier prize has been won and that the card 100 should be redeemed in a specified manner as directed by the lottery. For example, the consumer can be directed in the instructions in 155 to take the instant ticket/debit card 100 to a lottery office for cash, check, or an identified debit card as a form of payment.

Figure 6:
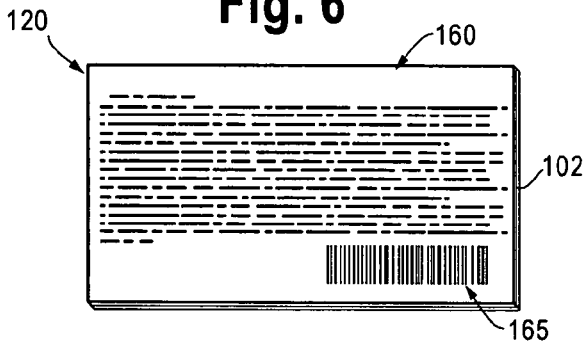
FIG. 6 is a plan view of the back of the debit card portions of the instant lottery ticket/debit cards of FIGS. 1-5.
Figure 7:
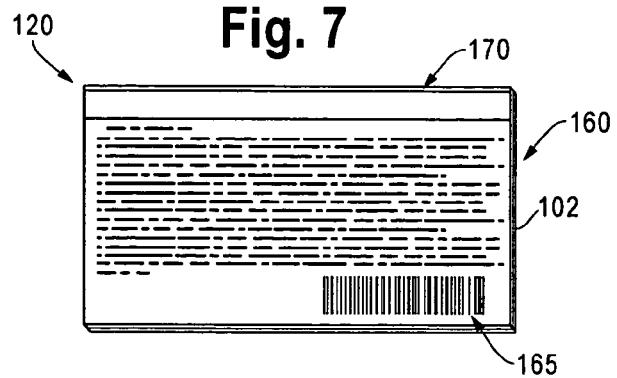
FIG. 7 is a plan view of an alternate back of the debit portions of the instant lottery ticket/debit cards of FIGS. 1-5.
Figure 11:
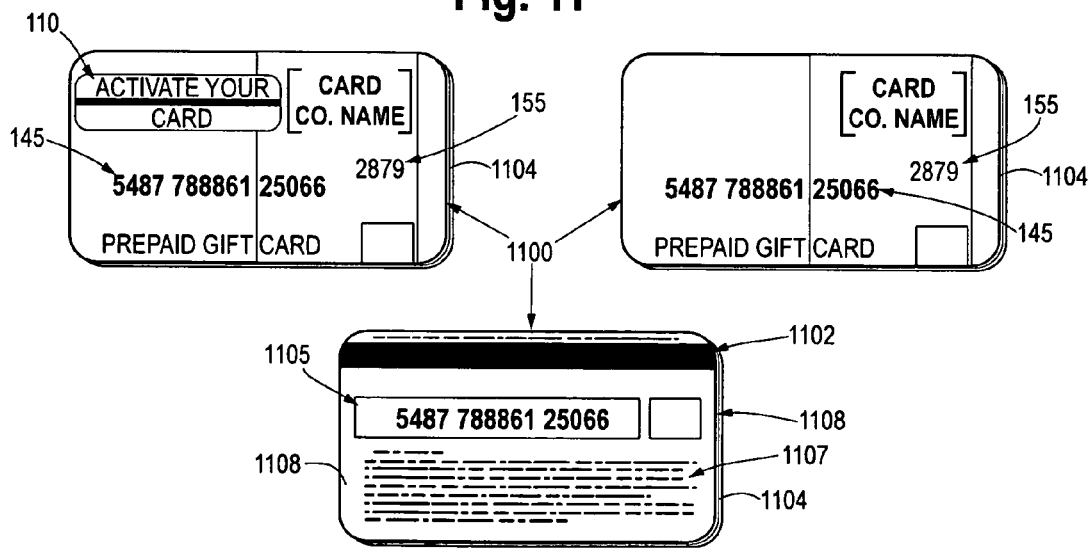
FIG. 11 is a front plan view of a representative example of a plastic debit/credit/gift card that can be linked to a separate lottery ticket or used as a standalone lottery instrument.

FIGS. 6 and 7 illustrate alternate backs of the debit card 120. In both cases the backs of the cards 120 can be printed with legally required instructions 160 related to a debit card and can include an instant ticket unique barcode 165 that can be, for example, an inventory control number barcode. FIG. 7 depicts an alternate back of the debit card 120 that includes a magnetic stripe 170. However, there are situations where this configuration might not be preferred; because if the magnetic stripe includes the account number 145, the magnetic stripe 170 in certain lottery systems can potentially be used to pick-out winning tickets. Here, one tradeoff would be greater ease of use at retailer establishments versus a greater production cost and greater security risk or a more complicated activation process as discussed below. Conversely, there can be other situations, where the use of the barcode 165 might not be desirable and the magnetic stripe would be more desirable. For example, the card portion 120 can be configured as a standard debit, credit, or an ATM type card 1100 as shown in FIG. 11. In this example, the card portion 120 can be used by the consumer in normal, in-person, transactions with the lottery winnings being associated with the card's account number 145.

In a preferred mode of operation, at the time the instant ticket/debit card 100 is purchased by a consumer, the debit card account number 145 is activated in a central database and the funds become available for use by the debit cardholder. The revenue from the card purchaser can then be delivered to the account at the retailer's bank during a settlement process.

Figure 8:
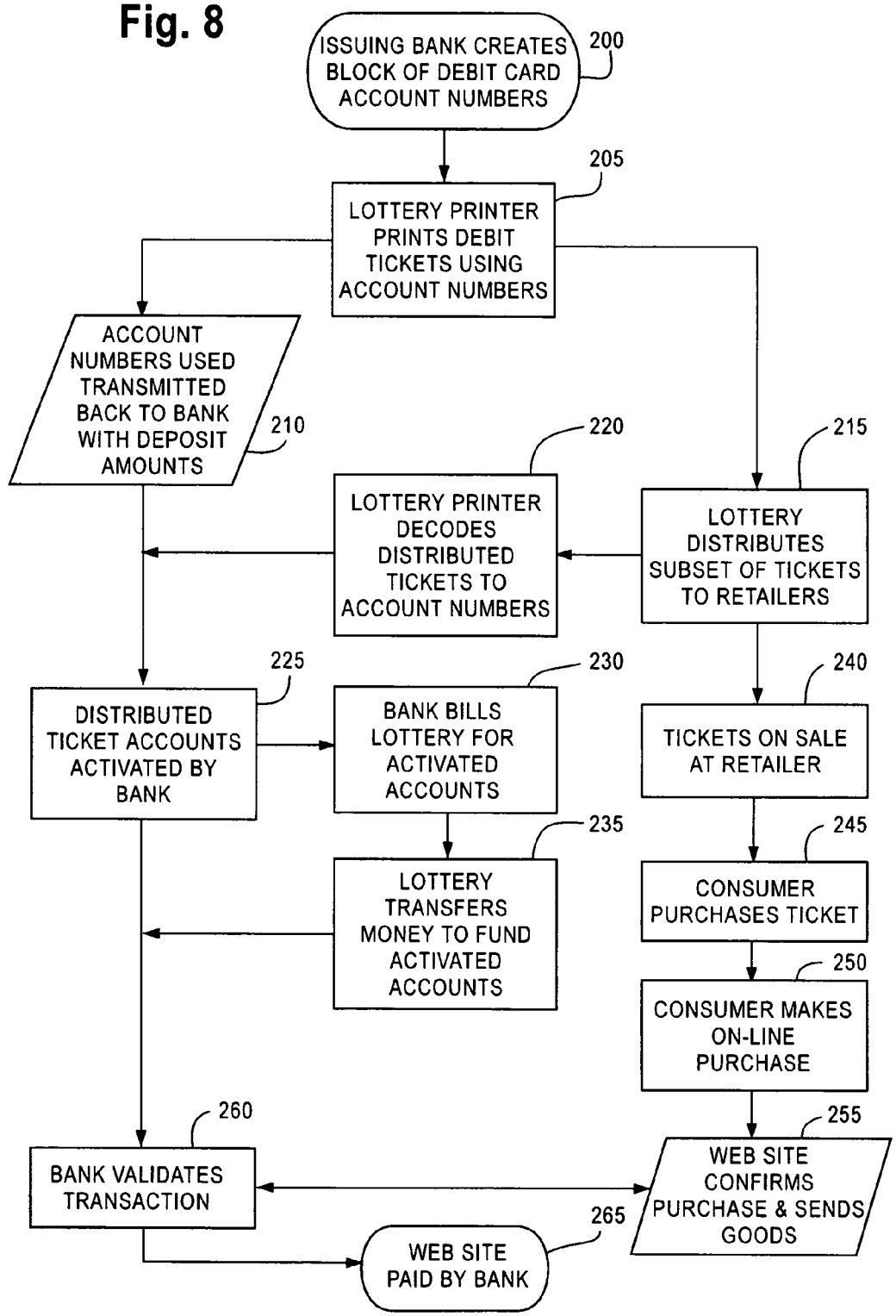
FIG. 8 is a flow chart illustrating a first method of producing, distributing, selling and using the instant lottery ticket/debit cards of FIGS. 1-5.

FIG. 8 illustrates a first method of producing and selling hybrid instant ticket/debit cards of the type 100. In this case it is contemplated that the hybrid instant ticket/debit card 100 would be distributed within an existing distribution network already in place for instant lottery games. However, in this case there can remain the added tasks of organizing the debit account numbers 145 and synchronizing deposits with the card-issuing bank.

The flowchart of FIG. 8 also outlines one method of completing these tasks. Beginning at a block 200, an issuing bank 145 creates and transmits a large block of new or unused potential debit card account numbers 145 to an institution responsible for printing lottery tickets. Typically this would be a lottery ticket manufacturer under contract with a state lottery administration to supply lottery tickets. Next, as represented at a block 205, the lottery ticket printing institution merges the block of debit card account numbers 145 with a set of instant ticket inventory control numbers, for example of the type contained in the barcode 165, thereby linking the instant ticket prize values with their associated account numbers 145.

In some cases it might be desirable that the block contain a larger number of debit card account numbers 145 than the total number of tickets 100 so as to allow for waste that typically occurs during the printing process. Since it is generally difficult to determine ahead of the printing process which instant tickets will become waste, a larger pool of pre-assigned debit account numbers 145 might be desirable to ensure that there are a sufficient number of account numbers 145 available to print the desired number of tickets 100. Therefore in this embodiment, after the print run is concluded at 205 and the desired number of tickets 100 are printed, the lottery printing institution, as shown at a block 210 will transmit the subset of account numbers 145 corresponding to tickets 100 actually printed.

For the purposes of describing the various embodiments of the cards 100, the bock 205 also represents a conventional lottery ticket printing apparatus which can for example print such card variable information such as the play indicia 115, the prize value 110 and the information 160 on the card substrate 102 using for instance an ink jet printer. The printing apparatus then can cover this variable information with the SOC 108 and print such display indicia as the purchase price 180, debit card minimum value 182, and the card portion identifiers 104 and 106.

Next in this example, as shown at a block 215, the lottery printing organization then physically ships the printed tickets 100 to the lottery's warehouse for distribution to a retailer base. When the tickets 100 are shipped to the retailers, or, when the retailers activate packs of the tickets 100, where pack activation is logged by the lottery, or when the individual tickets are activated at the time of purchase, the lottery transmits the listing of all activated instant ticket inventory control numbers 165 to the lottery ticket printing institution. The lottery ticket printing institution then can link the inventory control numbers 165 to the printed set of account numbers 145 as shown at a block 220 preferably using a secure algorithm typically used for this purpose in the instant lottery industry. It should be noted that it is desirable to ensure that the set of account numbers 145 associated with inventory control numbers 165 is maintained in a secure fashion to maintain security against pick-outs. As depicted at a block 225 the resulting list of account numbers 165 is then transmitted to the bank for activation along with the associated amounts of money to be deposited with each account number to a payment institution such as bank. In this embodiment, the role of the payment institution is to make payments from the account corresponding to the defined value card 120 to, for example, a vendor from whom a customer has made a purchase using the defined value card 120 or to dispense cash from an ATM machine. A payment institution can be a bank, a credit card company or other institution that is responsible for financing the defined value card 120.

Preferably, as shown at a block 230, upon receipt of the account numbers to be activated, the bank invoices the lottery for the necessary funds to be deposited into the debit card accounts. Alternatively, the bank can invoice the lottery ticket printing institution for transfer of funds. Still another possibility is for the lottery to deposit all funds for all debit card accounts at one time. This method has the advantage of fewer interactions, but with the disadvantage of moving a large sum of money at one time. In any case, the funds are preferably deposited when the accounts are activated or shortly thereafter as indicated at a block 235.

It should also be noted, that if the individual ticket 100 is activated at the time of sale, the above activation process would remain essentially the same, with individual tickets 100 being activated instead of packs. By definition, in this activation-at-time-of-sale embodiment, the tickets 100 would have to be sold or otherwise be distributed to consumers before the activation process could occur.

At this point in the example of FIG. 8, as illustrated by a block 240, the retailers place the received tickets on sale and after which consumers, as shown at a block 245, purchase the hybrid instant ticket/debit card 100. Then the consumer scratches off the SOC 108 and reads the amount 160 deposited on the debit card as well as the account number 145 and other identifying information. The consumer can then use this information to execute financial transactions, for example, an on-line purchase as shown at a block 250.

An example of the completion of a consumer transaction is provided in a block 255. Here, the store or vendor where the purchase is made transmits the debit card account number 145 and other information to the bank that confirms the account has sufficient funds for the purchase as indicated at a block 260, with the vendor finally reimbursed by the bank as shown in block 265.

Figure 9:
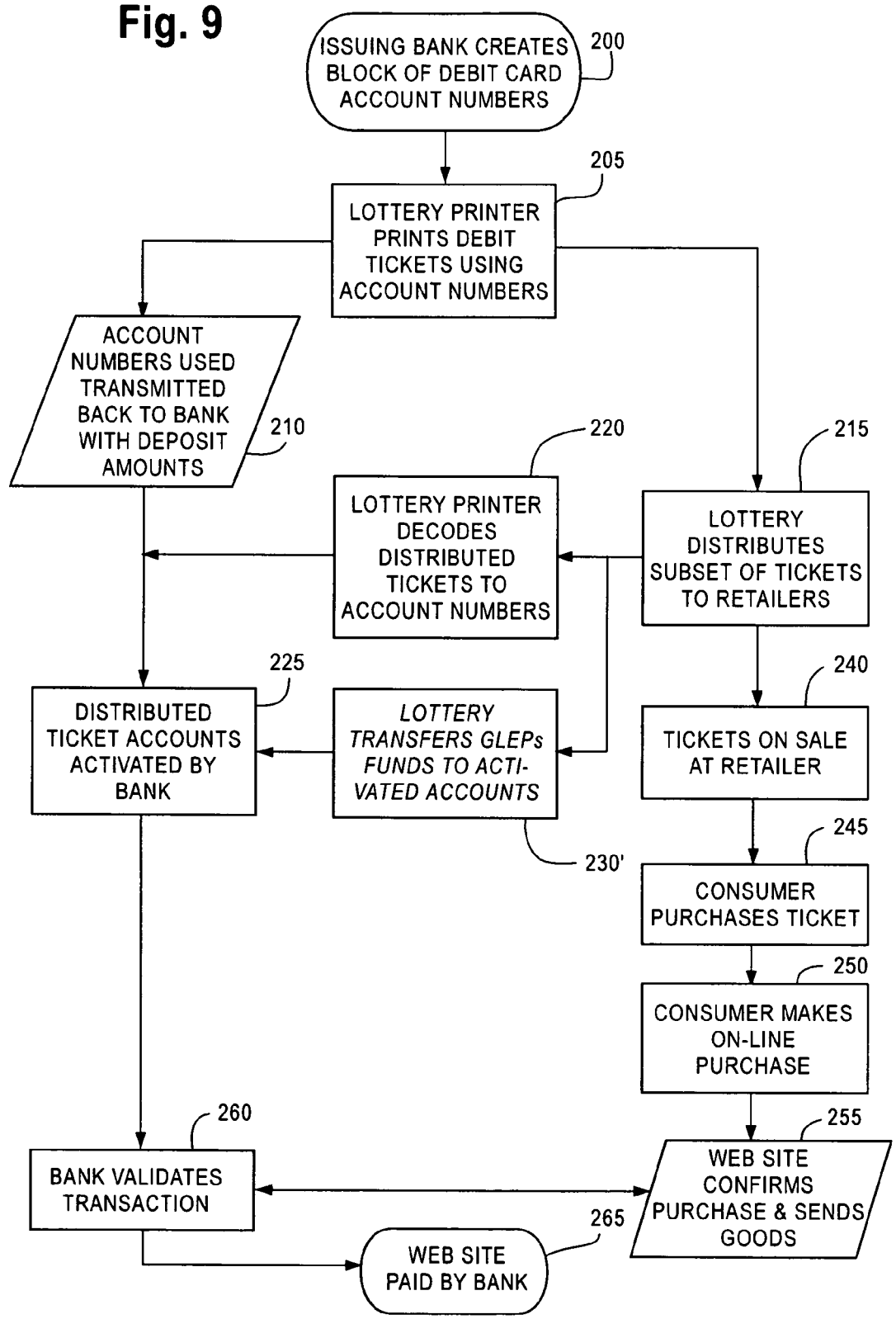
FIG. 9 is a flow chart illustrating a second method of producing, distributing, selling and using the instant lottery ticket/debit cards of FIGS. 1-5.

FIG. 9 is an illustration of an alternative embodiment of the card 100 distribution method of FIG. 8. However, in the embodiment of FIG. 9, the lottery can use a computed value related to the value of the debit cards 120 for depositing funds in the bank. In this example shown in a step 230', the funds to be deposited into the debit card accounts are calculated by multiplying the number of packs shipped to retailers by the number of tickets 100 per pack then multiplying the resulting product times the guaranteed minimum value of the debit card 120 and adding the product of the number of packs shipped and the Guaranteed Low End Prize Structure (GLEPS) value per pack for the given game. A GLEPS value is normally defined as the minimum value of the prizes per pack of tickets that is assured per game; for example, if a pack of one hundred $1 lottery tickets 100 has a GLEPS percentage of 35%, then the GLEPS value for the example pack would be $35. In this variation of the method, the lottery adds the product of the number of tickets 100 shipped and the guaranteed minimum value embedded on each debit card 120, such as $20, to the product of the number of Packs shipped and the GLEPS value per pack:

$$F=(P\times G)+((P\times T_p)\times M)$$

Where
F=Funds to be transferred
P=Number of Packs shipped to Retailers
G=GLEPS value per Pack
$T_p$=Tickets per Pack
M=Minimum Value of Funds on a Debit Card In the method of FIG. 9, the rest of the distribution can be identical to the embodiment of FIG. 8. Thus, this embodiment can generally be the same as the previous embodiment, with the exception that the lottery funds the issuing bank with an average value per pack rather than the actual value. This embodiment has the added security advantage of reducing the number of people cognizant of higher prize value tickets being shipped at any time. It should be noted that if this alternate embodiment is employed, an issuing bank might deem it necessary to prefund the accounts with the total of all high tier prizes, that is, prizes not covered by the GLEPS value, to ensure that the bank does not operate at a loss.

Still another embodiment would be for the issuing bank to activate all of the account numbers 145, once they are transmitted from the Lottery printer 210, with deferred funding for the activated accounts calculated by the GLEPs method 230'. This embodiment of the method can have the advantage of completely eliminating the step 220 of the Lottery Printer decoding instant ticket inventory numbers 165 to debit account numbers 145 thereby further isolating the knowledge base of debit account numbers 145 to lottery inventory control numbers 165. However, this method under certain circumstances might have the disadvantage of having all of the debit account numbers activated while the tickets 100 are still in the lottery's warehouse or in transit, resulting in possible security risks.

Figure 10:
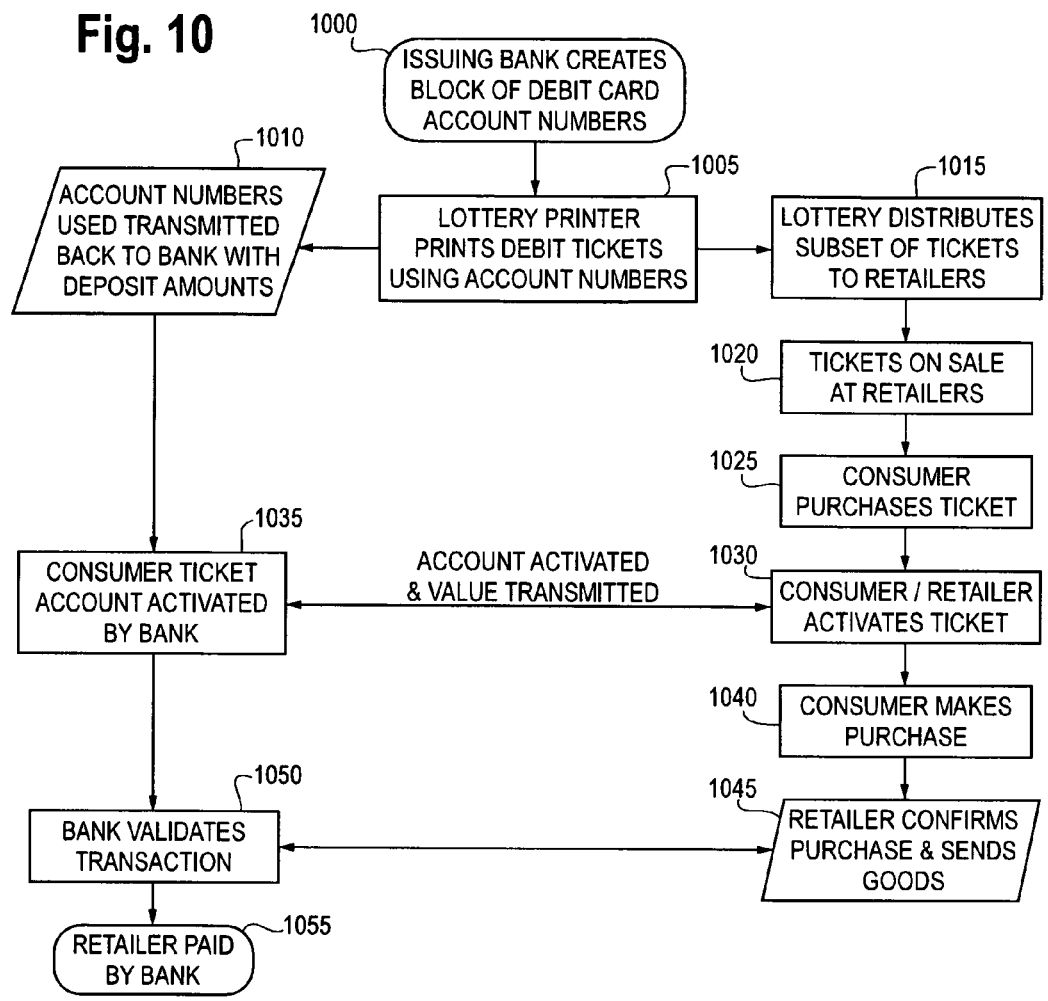
FIG. 10 is a flow chart illustrating another method of producing, distributing, selling, and using the instant lottery ticket/debit cards of FIGS. 1-5.

FIG. 10 depicts in flow chart form yet another alternative embodiment of a hybrid instant ticket/debit card distribution method. In this method, the bank responsible for issuing the debit card numbers at a block 1000 transmits at a block 1005 a large block of new or unused potential debit card account numbers 145 to the lottery ticket printing institution. Here, at 1005, after the print run is concluded and the desired number of tickets 100 is printed, the lottery printing institution transmits the subset of account numbers 145 actually printed along with the associated amounts of money to be deposited with each account number 145 to the issuing bank as well as physically shipping at a block 1015 the printed tickets 100 to the lottery's warehouse for distribution to the retailer base.

However, in this embodiment the method of activation, described below in a pair of blocks 1030 and 1035, allows for the account numbers 145 to be independent of any lottery inventory numbering system. In this case, the lottery printing institution can alternatively merge the block of account numbers 145 with associated prize values at the block 1005 and transmit the account numbers 145 and linked prize values 110 back to the issuing bank or other institution at a block 1010.

In either case, the tickets are distributed to retailers at a block 1020 and positioned for purchase. When the consumer purchases a ticket at a block 1025 he, or the retailer must first activate at a block 1030 the account represented by the account numbers 145 before attempting to use the hybrid product 100 for a purchase. One method of activating the account at a block 1030 is for the consumer to dial a specified toll free telephone number or visit a specified web site and enter the account number 145. At this point the debit card 120 would become activated at a block 1035 and the activation process could, optionally, inform the consumer of the actual value of the card 120. The consumer can then conduct purchases at a block 1040 using the card 120. When a purchase is made, the retailer would validate the card 120 as it would for any normal debit, credit, or gift card at a block 1045 by checking or confirming with the appropriate issuing bank or other institution 1050. After the transaction is completed the retailer can receive payment from the bank or other payment institution at a block 1055 as he or she would with any other debit or credit card transaction.

Funds can be transferred from the Lottery to the bank in any of the methodologies described in the previous embodiments.

Thus, this method is generally similar to the previous methods, with the exception that the consumer activates at the block 1030 the debit portion 120 of card 100 by dialing or logging onto an activation system at 1035 or by the retailer at the time of purchase in front of the consumer, for example, scanning a barcode or entering data previously printed under the SOC 108, or by other similar methods well known in the art. This activation process can include simply entering the account number 145 on the card 120 or entering other activation data. This embodiment has the advantage of possible added security with the consumer performing the activation as well as optionally providing a method for the activation system to inform the consumer if he has in fact won a prize. This automated prize information feature can confirm the prize value 110 printed on the lottery ticket 105 for the consumer, or alternatively eliminates the need for lottery ticket 105 since the consumer would find out if he won a prize during the process of card 120 activation at the blocks 1030 and 1035. In the event that the lottery ticket portion 105 is eliminated, the card 120 can take the form of a more conventional debit/credit/gift card, that is plastic with magnetic stripe for example, since the value of the card would only be known when it was activated as shown in FIG. 10. This guards against retailer pick-out, for example where a retailer scans all unsold cards 120 for prize values and only sells cards 120 with no additional prize value to the public, since the consumer would be alerted that the card was already activated when he attempted to activate it at the blocks 1030 and 1035 after or at the time of purchase at 1025. Also in this embodiment, due to this activation prize information feature, it might reduce the motivation to assign lottery inventory control numbers to the card 120 prior to sale at the block 1025 or for that matter, even package a lottery ticket portion 100 with the card 120. Funding for this alternative embodiment can be similar to the previous embodiments.

In the various embodiments described herein, it is preferred that such method steps as: the linking account numbers 145 to the debit cards 120 at step 205; the decoding distributed cards 100 at 220; and computing GLEPs funds at 230' be performed by an apparatus such as a specially configured or programmed digital computer. It is preferable to use such apparatus for a number of reasons including the potentially large volume of cards that can be produced and sold and the desirability of enhanced security that can be provided by encryption and other digital security techniques. For the same reasons, it is preferred the steps of transmitting information such as transmitting the account numbers 145 back to the payment institution in the step 210 and as shown at the block 225 transmitting the list of account numbers 165 to the bank for activation be performed electronically.

FIG. 11 depicts an alternative embodiment of a hybrid lottery instrument/debit or gift card 1100, which utilizes a standard magnetic stripe 1102 without the added security risk of pick-out due to the card's autonomous manufacturing from the lottery ticket portion since the true value of the card 1100 will in this embodiment only be known after purchase and subsequent activation. One advantage of using a magnet stripe or equivalent machine readable media to store such information as an account number is that it facilitates the automatic debiting of such instruments as debit, credit, or gift cards. In the preferred embodiment, the card 1100 is configured as a debit, credit, or gift card using a plastic substrate 1104 in a manner similar to currently available debit and gift cards. As with typical plastic debit or gift cards, the card 1100 can include the account number 145 and the CID 155 printed or embossed on the front (or back) of the card 1100 in human readable form along with a set of information and instructions 1107 printed on the back 1108 of the card 1100. This printed information 1107 can include legally required instructions related to debit/credit/gift cards as well as information related to the lottery instrument associated with the card 1100. The magnetic stripe 1102 can contain the same general type of information as currently available debit or gift cards such as the account number 145, a name representing the cardholder, a country code, and expiration date along with various control and error checking data. In addition, the magnetic stripe can be used to store other data that might be useful in the context of the type of card 1100 including data representing: a state; the specific type of card, for example credit, gift, or debit; type of payment such as a nano-payment; and the nature of the associated lottery instrument such as an instant ticket or a lotto drawing. However, in this particular embodiment, only a standard human signature block 1105 is included on the card back 1108 without a lottery barcode because the plastic card 1100 can be linked to the lottery instrument at time of manufacture. Instead, specific instructions for the consumer to electronically link any lottery winnings to the debit or gift card after purchase are included by the removable instruction label 1110 on the top left-hand view of FIG. 11. For example, the removable instruction label can be used to direct the consumer to dial a toll-free number or to visit a web site to activate and find out if the card was a winner or not. For added amusement, the consumer can be provided with the option to play a game at a web site that has a predetermined outcome which can be used to inform the consumer if he or she has won a prize. In this embodiment no associated lottery ticket would be required resulting in a cost savings and, in certain circumstances, enhanced security.

Figure 12:
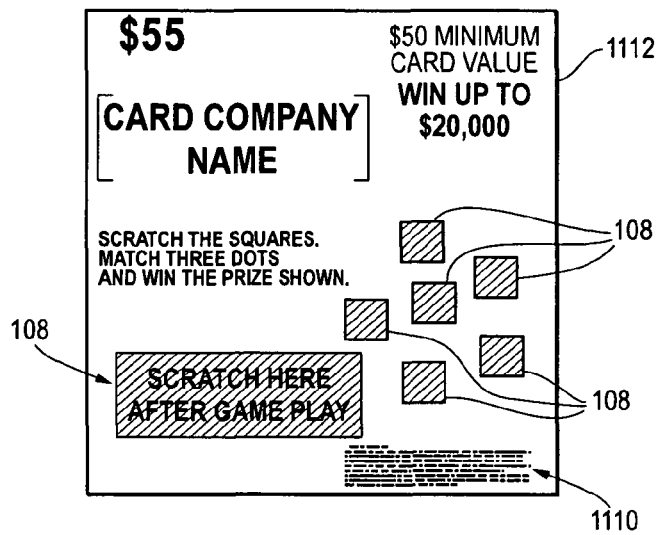
FIG. 12 is a front plan view of a first representative example of a lottery ticket linked to a plastic gift card of the type shown in FIG. 11.
Figure 13:
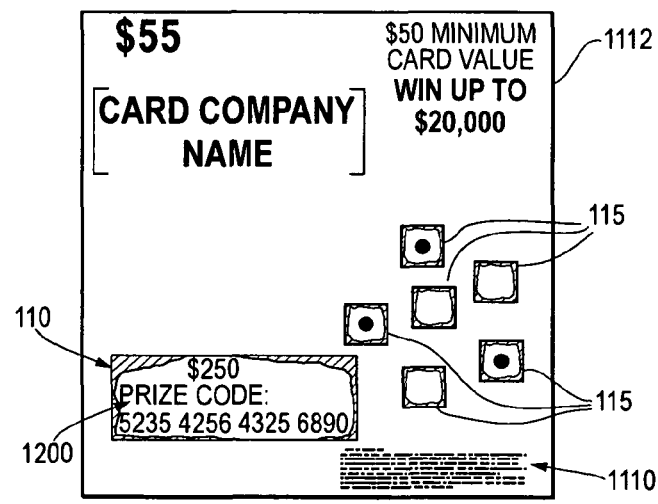
FIG. 13 is a front plan view of lottery ticket of FIG. 12 with the scratch-off coating removed.

FIGS. 12 and 13 provide another example of a lottery instrument, in this case an instant lottery type ticket 1112, that can be sold packaged as an alternative or an additional embodiment of the hybrid lottery instrument/debit or gift card of type 1100 illustrated in FIG. 11. As with the previous embodiments of the lottery ticket portion 105, this embodiment includes the SOC 108 that preferably covers printed instant lottery indicia such as a prize value 110 as well as a set of play indicia 115. When played and the SOC 108 is removed as shown in FIG. 13, that this is a winning lottery ticket is indicated by the matching indicia in 115. This indicates to the consumer that the winning amount 110 can be added to the associated debit or gift card 1100. However, in this embodiment, the winning funds from the lottery ticket 105 must be transferred by the consumer to the debit or gift card 1100 using a prize code 1200 printed under the SOC 108 by the method described in the printed instructions 1110 of FIG. 12. When the consumer transfers the lottery ticket portion funds to the debit or gift card 1100, the card's account number 145 will reflect the balance of the prepaid debit or gift card and the lottery ticket portion. Thus, the card account number 145 would only have added value after the instant ticket portion was played and any winning value was transferred. Thus, the exposed magnetic stripe 1102 on the back of the card 1100 in this embodiment would not pose a security risk in terms of retailer pick-out or unsold cards, since all debit or gift cards of type 1100 can be manufactured with the same defined value.

To add lottery ticket value to the debit card the consumer in this embodiment would be instructed to enter the prize code 1200 previously hidden under the SOC 108. The prize code 1200 can be cryptographically protected, for example, by a secured keyed hash of the ticket inventory number and the prize amount, and sufficiently long to thwart guessing attacks by an individual attempting to falsely add value to a debit or gift card of type 1100. Additionally, the activation system can also limit the number of times a consumer could attempt to add lottery funds to a debit or gift card of type 1100, e.g., three times, as well as only allow a cryptographically protected prize code to be used once. These methods of protecting the prize code 1100 data are just one example of a multiplicity of available and familiar techniques.

Figure 14:
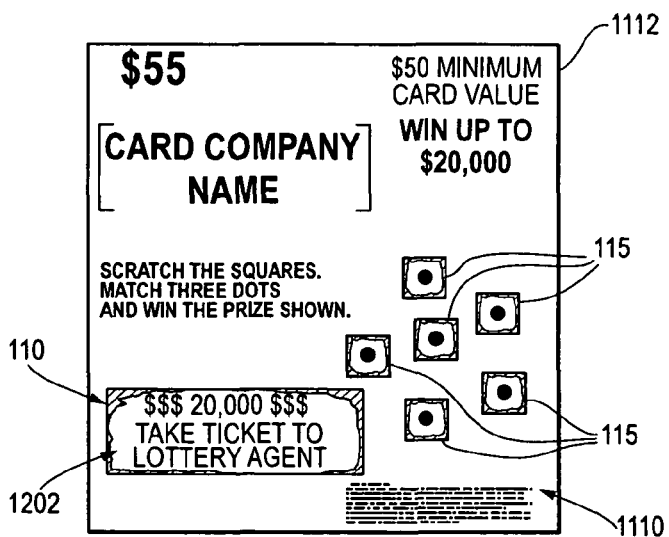
FIG. 14 is a front plan view of a second representative example of a lottery ticket linked to a plastic gift card of the type shown in FIG. 12 with the scratch-off coating removed.

FIG. 14 shows, as in previous embodiments, a high-tier winning lottery ticket 1112. However, the ticket 1112 in this embodiment would not allow the high-tier winning funds 1200 to be transferred to the debit or gift card 1100. As illustrated in FIG. 14, a high-tier winning ticket in excess of the legal limit for anonymous funds can be treated as a special case conventional instant lottery ticket. In this example, instead of the prize code 1200 in the revealed prize area 110, a set of instructions 1202 is printed under the scratch-off coating 108, informing the consumer that a high tier prize has been won and that it must be redeemed at the lottery. The consumer can then take the instant ticket 105 to a lottery office for cash, check, or an identified debit card as a form of payment.

In any case, this embodiment has the advantage of providing a standard type plastic debit/credit/gift card 1100 with a magnetic stripe while adding an unsynchronized lottery ticket to the debit/credit/gift card package. Here, the term 'unsynchronized' means that the lottery ticket 1112 is not associated with the plastic card 1100 at time of manufacture or packaging. Rather, the lottery value is added to the card 1100 by the consumer during the activation process.

FIG. 15 illustrates a method for implementing the embodiment shown in FIGS. 12 and 13. As shown in this example at a block 1115, a bank or other payment institution responsible for issuing the debit or gift card account numbers 145 produces at a block 1125 the plastic debit or gift cards 1100 in the manner commonly used for debit or gift cards. The lottery printer prints as shown at a block 1120 the lottery ticket portion 105 preferably utilizing secure cryptographic techniques to generate the prize code data 1200 on the lottery ticket 105. In this example at a block 1130, after the print run is concluded and the desired number of tickets 1112 are printed, the lottery printing institution receives the physical debit or gift cards 1100 and packages each card 1100 with a lottery ticket portion 1112 at 1130. Since the lottery ticket portion 105 prize code 1200 is linked to the card 1100 account number 145 by the consumer in this embodiment, there is no need to ensure that any given lottery ticket 1112 be packaged with an associated card 1100.

However, in this embodiment the method of transferring winning funds from the lottery ticket 1112 to the debit or gift card 1100, as described below in conjunction with a pair of steps 1160 and 1165, allows for the account numbers 145 to be independent of any lottery inventory numbering system. In this case, the lottery printing institution would not be cognizant of the debit or gift card account numbers 145 packaged with the lottery ticket 105 since the synchronization of the lottery funds to the debit or gift card account number 145 occurs only after the consumer has purchased the packaged ticket 1112 and card 1100. Since the cards 1100 are not synchronized with the lottery ticket 1112 at the time of packaging, the lottery printer and lottery can maintain inventory using the lottery ticket 105 unique serial number 165 as shown in FIG. 7. Thus, the packages can be distributed through normal channels as shown by a block 1135 with the associated added prize code funding provided to the bank or card issuing institution at a block 1140 in a manner similar to the methods previously discussed. Once the bank or card issuer receives the prize codes 1200 that were distributed, note that the bank or card issuer is not cognizant of the lottery inventory information 165 as is generally the case as in the previous embodiments; the prize codes 1200 and associated amounts can at this point be loaded onto its activation/transfer system as shown in a block 1145. For added security, the prize code 1200 and amount can be partially recorded on a lottery central system with the remainder of the prize codes 1200 being calculated real time when missing information is provided by the consumer from the ticket, for example, a key for a secured keyed hash that generates a check code resident on the central server based on the inventory number of the lottery ticket 105 and the prize amount, or a hash of the prize code can be kept on the central server with a clear text prize amount, etc.

In this embodiment, the ticket 1112 and card 1100 packages are distributed to retailers at a block 1150 and positioned for purchase. When at a block 1155 the consumer purchases a ticket/card 105 and 1100, he can play the lottery ticket 1112 and then transfer the winning funds to the card 1100 having the account number 145 as shown at a pair of blocks 1160 and 1165 before attempting to use the hybrid product for a purchase. The transfer 1160 of any winning funds can also optionally include a card 1100 activation process that would notify the system that the debit or gift card has been purchased and will be used shortly. One possible method of transferring funds/activating the account 145 at the step 1160 is to instruct the consumer dial a specified toll free telephone number or visit a specified web site and enter the account number 145 and winning code 1200 as illustrated in the instructions 1110 on FIG. 12. At this point the card 1100 would be activated with the correct funds at the step 1165 and the activation process can, optionally, inform the consumer of the total value of the card 1100. The consumer can then conduct purchases as shown at a block 1170 using the card 1100. When a purchase is made, the retailer can validate the card 1100 as shown at a pair of blocks 1175 and 1180 as he or she would for any conventional debit or gift card by checking with the appropriate issuing bank or other payment institution. After the transaction is completed, the retailer in this embodiment will receive payment from the bank or other payment institution as shown at a block 1185 as would be the case with other conventional debit or gift card transactions.

Thus, the embodiment of FIG. 15 can generally be the same as the previous embodiments, with the exception that the consumer or retailer transfers the lottery ticket 105 portion of the funds to the card 1100 by various methods including dialing or logging onto an activation system depicted at the blocks 1160 and 1165. This transfer process can include simply entering the account number 145 on the card 1100 or entering other activation data. This embodiment has the advantage of possible added security with the consumer, or retailer at time of sale performing the transfer as well as optionally allowing the system to inform the consumer if he or she has in fact won a prize. This automated prize information feature can confirm the prize value printed on the lottery ticket portion 1112 for the consumer. Since the consumer synchronizes the lottery ticket portion 105 to the card 1100 the system guards against retailer pick-out, that is, where the retailer scans all unsold cards 1100 for prize values and only sells cards 1100 with no additional prize value to the public, because the consumer performs the synchronization using the scratch-off lottery ticket 1112 secured with standard scratch-off lottery well known security techniques. Also, because of this transfer prize information feature, it is not necessary to assign lottery inventory control numbers such as can be contained in the barcodes 165 to the card 1100 prior to sale.

FIG. 16 provides an example of how a ticket of the type 100 can be used for age and location identified transactions. In this case, a lottery's diverse distribution of retailer outlets, private network, and support infrastructure is particularly useful for the sale of the combined instant lottery ticket/debit card 100. Here, sales of the instant lottery ticket/debit cards of the type 100, for example, with proof of age and location can be readily accommodated with a lottery sales infrastructure. The typical lottery retail outlet is normally very familiar with requiring proof of age identification for purchases of alcohol, tobacco, and lottery tickets. Therefore, the combined instant lottery ticket/debit card 100 that requires age verification for purchase can be arranged such that it would require little or no appreciable additional overhead to the retailer. As a result, by utilizing the instant lottery ticket/debit card 100 that additionally carries an inherent proof of age, and possibly location, for Internet transactions, the system can enable Internet gaming within a state's border for example. Also, this mechanism can be used to meet proof of age or location requirements for other on-line purchases such as, alcohol, or tobacco. Web site visitors can have their age and location digitally verified while maintaining their anonymity.

Since lottery products in most locations can legally be sold only to individuals eighteen years or older, a lottery retailer is generally required to age restrict sale of these products. As a result, there would be no added costs involved for the retailer to certify that only someone eighteen years or older has purchased the combined instant lottery ticket/debit card 100. FIG. 16 is used to illustrate one approach for identifying the debit card 120 portion of the ticket 100 as being age certified such that automatic age certification can be implemented over an existing credit/debit/gift card infrastructure. In this embodiment, a Bank Identification Number (BIN) 184 is used. Typically, the credit/debit card infrastructure embeds the BINs 184 in all credit/debit card account numbers such as 145. Here, the BINs 184 can be used as a flag for both age and location authentication. As illustrated in FIG. 16, a first digit 175 of the account number 145 printed on the debit card 120 can be used as a type identifier for a payment institution, that is for example a "4" for a first bank or card issuer, a "3" for a second bank or card issuer, etc. The next five digits of the account number 145 printed on the debit card 120 comprise the BIN 180. It should be understood that the term "the" BIN is slightly inaccurate, because an issuing bank can have multiple BINs that can be used for specific purposes, usually to identify a specific type of card issued by the bank. In this case, if a specific BIN 184 is assigned to the combined instant lottery ticket/debit card 100, for the purpose of this description called a 'lottery BIN', the combined instant lottery ticket/debit card 100 can be automatically age authenticated when the consumer purchases the card 100. It should be understood that the lottery BIN 184 is simply one subset of numbers in a debit card account that can be used for identification purposes. Many other number(s) relating to a debit card account can be reserved for the described authentication and identification purposes.

In transactions utilizing the debit card 120 of the type shown in FIG. 16, a merchant can program its system or web site to check for the lottery BIN 184 or other special code embedded in a debit card transaction. If the debit card account number 145 includes the lottery BIN 184, no further age identification is needed and the sale of liquor, cigars, etc. can, in this embodiment, proceed without further age or other forms of authentication. Additionally, since the account number 145 is generally approved as valid with sufficient funds at the issuing bank's computer system in this embodiment, it will be difficult for underage consumers; for example, to make age limited purchases by simply changing the BIN 184. Furthermore, the limited amount pre-deposited in the debit card 120, makes it likely that the card 120 will have a limited life in the market place and thereby further reduce the probability that an underage minor would illegally use the debit card 120.

FIG. 17 provides an illustration of how the process outlined above can be applied to location authentication. For instance, if a unique BIN 184 is assigned to a state lottery, it is an indication that the instant lottery ticket/debit card 100 was purchased within that lottery's jurisdiction and the debit card portion 120 can then be used to engage activities such as internet gaming that are jurisdictionally limited.

As shown in FIG. 17, this embodiment of a BIN age/location authentication process can be implemented as a variation on the ticket production/sales process of FIG. 9. In this embodiment, the bank responsible for issuing the debit card numbers would transmit at 200 a large block of new or unused potential debit card account numbers 145 to the institution responsible for printing lottery tickets as before. In this embodiment, however, the BIN 184 embedded in the block of account numbers 145 would be reserved for age and location identification. The lottery ticket printing institution would then merge at 205 the block of debit card account numbers 145 with the instant ticket inventory control numbers 165 and at 210 return a subset of account numbers 145 used after the print run is completed As in the process of FIG. 9, the lottery printing institution physically ships at 215 the printed tickets 100 to the lottery's warehouse for distribution to the retailer base. When the tickets 100 are shipped to the retailers, the lottery also transmits the listing of all shipped/activated instant ticket inventory control numbers 165 to the lottery ticket printing institution. The lottery ticket printing institution at 220 then links the inventory control numbers 165 to the printed set of debit account numbers 145 using a secure algorithm. The resulting list of account numbers 145 is then transmitted at 225 to the issuing bank for activation. Upon receipt of the account numbers 145 to be activated, the bank invoices at 230 the lottery for funds to be deposited into the debit card accounts.

Next at 240, the retailers place the received tickets 100 on sale and consumers purchase the hybrid instant ticket/debit card 100 after, as shown at a block 245', the consumer has proved that he is of legal age for the jurisdiction, for example, eighteen or older. The consumer scratches off the SOC 108 and discovers the amount 160 deposited on the debit card as well as the account number 145 and other identifying information. At 250 the consumer then can use this information to make on-line purchases. As shown at a block 255', the store or on-line site where the purchase is made, if an age restricted good is being sold, automatically scans the account number 145 of the debit card to determine if there is an age-authentication 'lottery BIN' 184 present. If not, the store automatically refuses the sale or can request another means of age-authentication. However, if the age-authentication 'lottery BIN' 184 is present, the store transmits the debit card account number 145 and other information to the issuing bank that confirms the account has sufficient funds for the purchase 260. The store ships the goods to the consumer at 255 and receives payment from the issuing bank at 265. A similar process would also be employed for location authentication.

Figure 18:
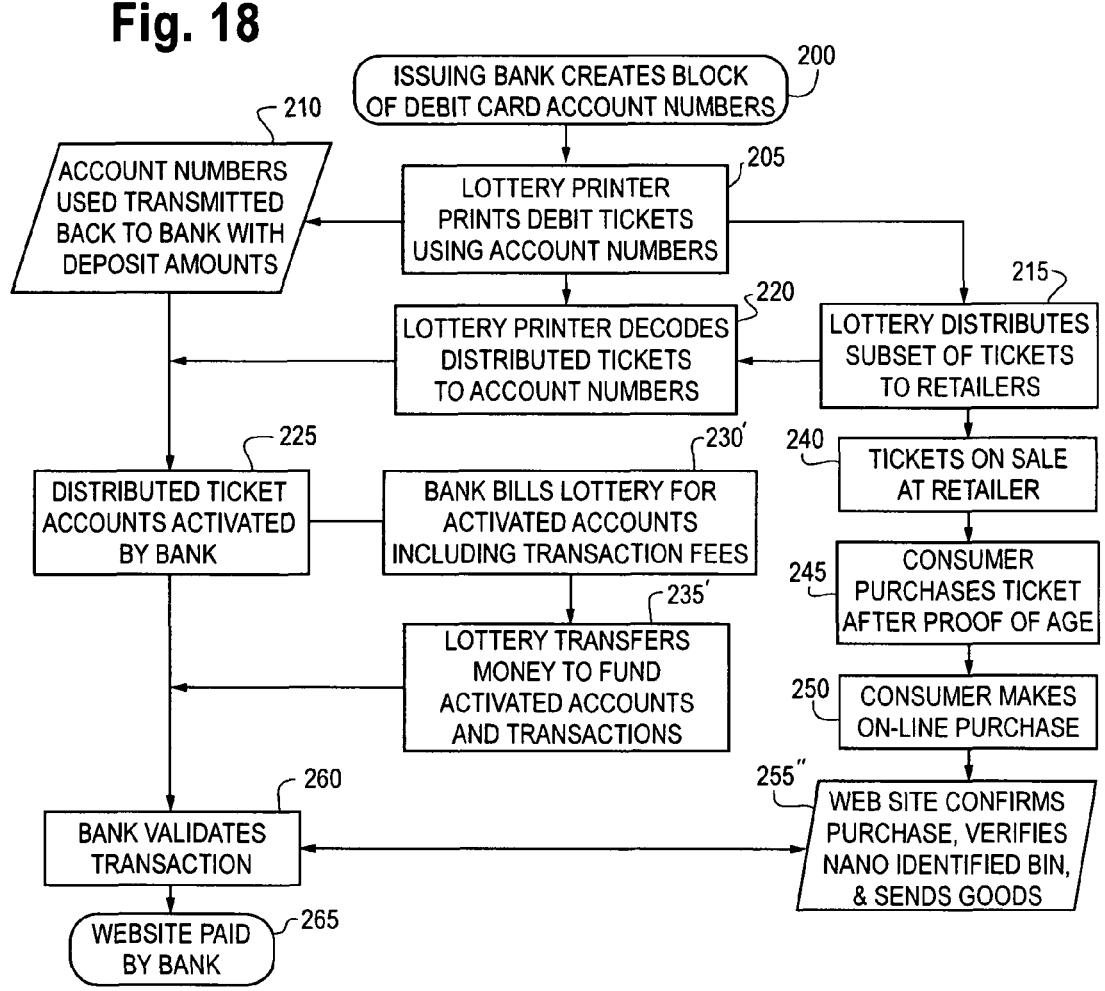
FIG. 18 is a flow chart illustrating one method of producing, distributing, selling and using the instant lottery ticket/debit cards of the type shown in FIGS. 1-5 that can be used in connection with micro/nano payments.

FIG. 18 illustrates one embodiment of a system that can facilitate micro and nano transactions. Micro or nano payment systems are usually defined as methods for transferring very small amounts of money, in situations where collecting such small amounts of money with the usual payment systems is impractical, or very expensive, in terms of the amount of money being transferred. These payments are typically too small to be affordably processed by credit card or other electronic transaction processing mechanisms. However, this problem can be overcome utilizing an arrangement such as the instant ticket/debit card model described above. In this embodiment the instant ticket/debit card 100 can be adapted to permit credit/debit card transaction fees to be paid out of the prize fund of a lottery. As a result, each debit transaction can be substantially reduced and in some cases result in no transaction costs to the selling store. In many cases, this approach can provide a basis for the economic use of micro and nano payments. Here, utilizing the instant ticket/debit card model as exemplified in FIG. 18, recovering transaction processing fees from the prize fund can permit multiple deductions from debit accounts to be made without also deducting transaction fees at the time of the transaction. Further, the ability to deduct transaction fees from a prize fund and thereby prepay all transaction costs can result in a debit or credit system where the transaction's cost is not apparent to the consumer. Moreover, such a system can be implemented that is backwardly compatible to existing Internet sites which accept debit and credit cards.

In this embodiment, the 'lottery BIN' 180 embedded in a credit/debit card account number 145 can also be used to identify the account as a no fee transaction to the seller. As with age or location authentication, the 'lottery BIN' 180 can be used to easily identify to a seller that a particular transaction will not incur transaction fees to the seller and can therefore be eligible for a micro or nano payment.

As depicted in FIG. 18, utilizing a unique BIN authentication for micro and nano payments can be implemented using the basic process illustrated in FIG. 8. In the process of FIG. 18, the bank responsible for issuing the debit card numbers at the step 200 would transmit a large block of new, unused, potential debit card account numbers 145 to the institution responsible for printing lottery tickets. In this application, the BIN 184 embedded in the block of account numbers 145 is reserved for prepaid transaction fee identification. The lottery ticket printing institution would then merge at the step 205 the block of debit card account numbers 145 with the instant ticket inventory control numbers 165 and at the step 210 return the subset of account numbers 145 used after the print run is completed.

Then in this embodiment as shown at 215, the lottery printing institution will physically ship the printed tickets 100 to the lottery's warehouse for distribution to the retailer base. When the tickets 100 are shipped to the retailers, the lottery also transmits the listing of all shipped/activated instant ticket inventory control numbers 165 to the lottery ticket printing institution. At this point 220, the lottery ticket printing institution links the inventory control numbers 165 to the printed set of debit account numbers 145 using the secure algorithm. Subsequently at a step 225, the resulting list of account numbers 145 is transmitted to the issuing bank for activation.

As indicated by a block 230', upon receipt of the account numbers 145 to be activated, the bank invoices the lottery for the necessary funds to be deposited into the debit card accounts. However as shown in a block 235', in the micro or nano transactions of the embodiment of FIG. 18, the funds to be transferred will preferably include prepaid transaction fees as well as the total amount to be deposited on each card.

In this embodiment as shown at 240, the retailers place the received tickets 100 on sale and at the step 245 consumers purchase the hybrid instant ticket/debit card 100. Again, the consumer scratches off the SOC 108 and reads the amount 160 deposited on the debit card 120 as well as the account number 145 and any other identifying information. Then at 250, the consumer can use this information 160 and 145 to make a purchase including on-line purchases.

Here in this embodiment, as shown at a block 255", the store or web site for example, where the purchase is made can automatically scan the account number 145 of the debit card 120 to determine if there is a nano-authentication lottery BIN 184 present. If not, the store can automatically inform the consumer that he needs a lottery debit card to conduct the desired transaction. However, if the nano-authentication lottery BIN 184 is present, the store as indicated at 255" transmits the debit card account number 145 and other information to the issuing bank that confirms the account has sufficient funds for the purchase as shown at 260. If the funds are sufficient, the store ships the goods or provides the purchased services to the consumer as shown at 255" and at 265 receives payment from the issuing bank.

It should be noted that the description of the micro and nano payment system depicted in FIG. 18 that utilizes the combined lottery ticket and debit card 100 only represents the preferred embodiment of such a system. Other objects of value can be used in place of the lottery ticket portion 105 and other forms of transaction objects can be used in place of the debit/credit card portion 120 in such a combined product.

Figure 19:
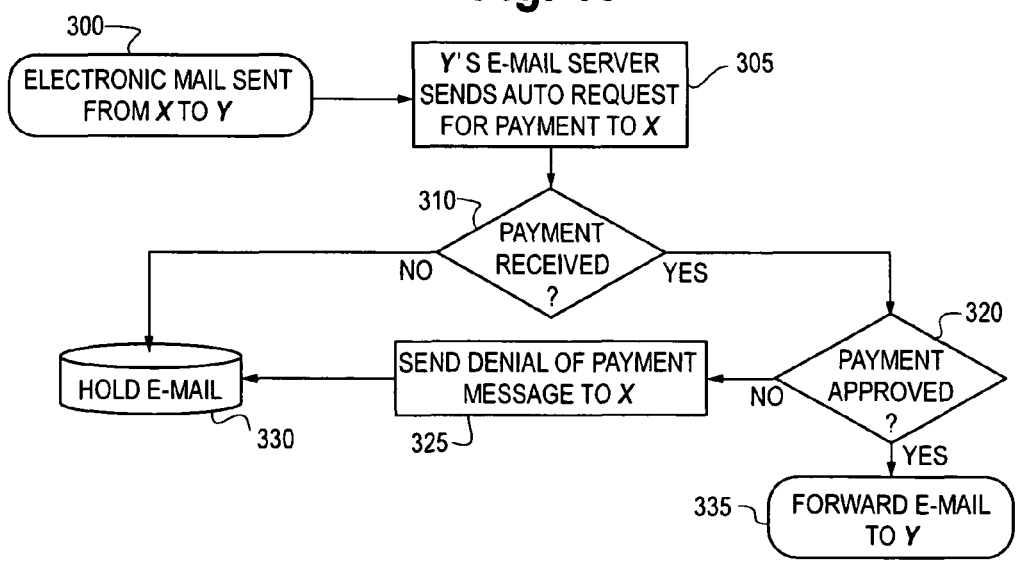
FIG. 19 is a flow chart illustrating operation of a spam filter.

FIG. 19 depicts an example of how a system of the type shown in FIG. 18 can be used as a spam filter. The described spam filter, which involves payments in order to transmit electronic mail to specific addresses, can reside at the electronic mail server level and effectively be transparent to the user. As shown at an initial block 300, when an electronic mail is transmitted from X to Y, a receiving server can be used to hold the pending mail and at a block 305 send a request for a nano payment to the transmitting server. It should be noted that the method described is intended to illustrate the basic concept of spam filtering via a nano payment request. Numerous other embodiments of this concept can be implemented and, in certain circumstances might be more desirable. For example, the recipient's electronic mail server can be programmed to first evaluate a pending mail to determine if a known 'friend' sent the mail; if so; the mail server can then be programmed to automatically forward the mail without requiring a payment.

In the embodiment of the process as depicted in FIG. 19, the receiving server, as shown in a decision block 310, will then wait a predetermined time period for a payment indication to be received. The payment indication can be a bit stream or code that normally represents a money transfer. If the payment indication is received before the predetermined time period expires, the server, as shown at a block 320, will next validate or authenticate that the payment represents a valid transfer of funds. For example, the validation process can determine if a nano-authentication 'lottery BIN' 180 is present. In this example, the nano payment deposit can be to another nano-authentication 'lottery BIN' debit card account.

If the payment is authenticated, the server, as shown at a block 335, will forward the electronic mail to Y's computer. If a payment is received but not valid, for instance if there is no nano-authentication 'lottery BIN' 180 present, a message indicating a denial of payment by electronic mail will be sent to X, as shown in a block 325. And, the pending electronic mail, in this embodiment, can be temporally stored, as shown in a block 330, in a special holding area for possible evaluation by Y. The electronic mails stored in the holding area can be held for a predetermined time period and then automatically deleted. In this case, Y can be given the opportunity to review the electronic mails stored in the holding area prior to deletion.

Figure 20:
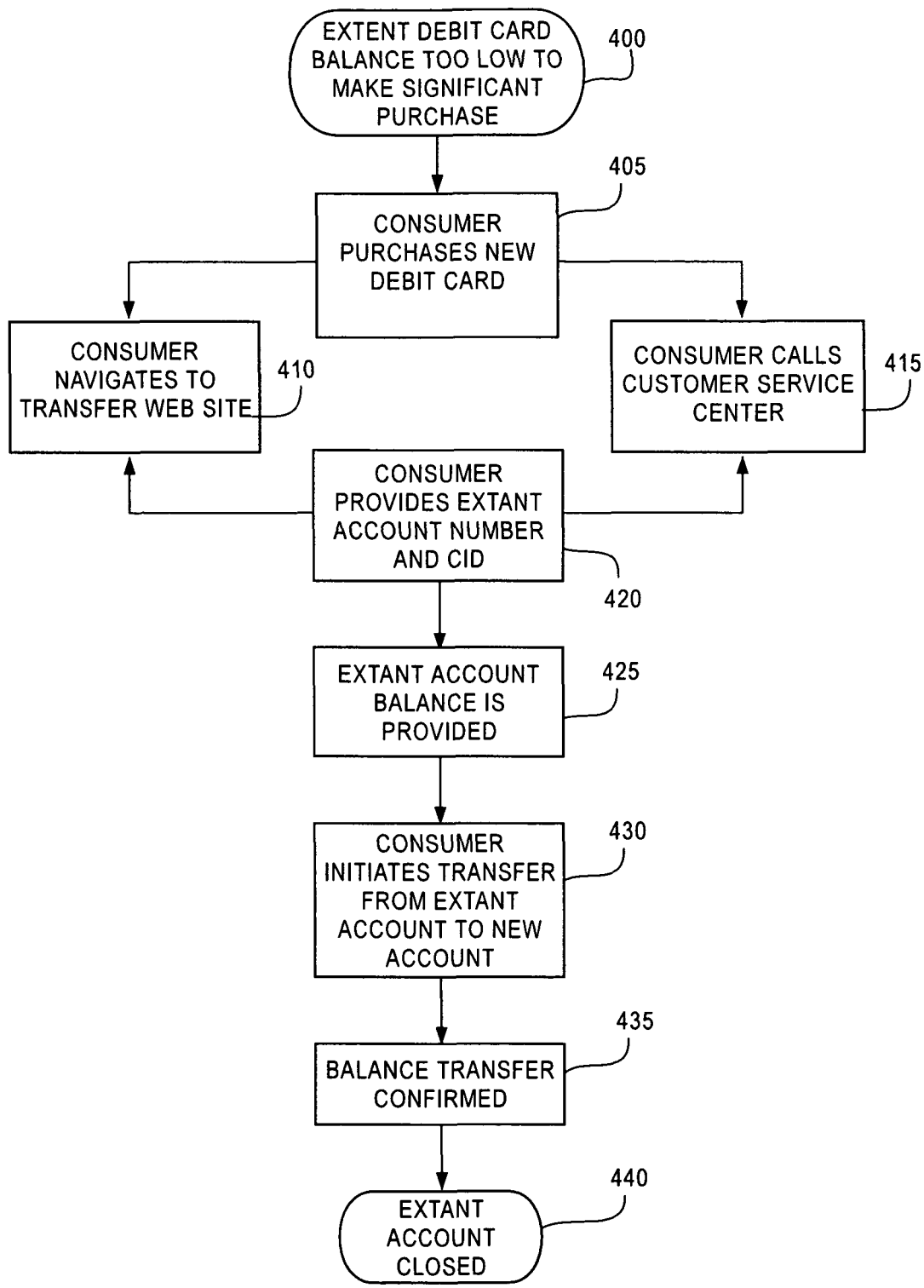
FIG. 20 is a flow chart illustrating account transfers.

FIG. 20 illustrates one method that can be used to permit balance transfers in connection with the methods described above. For example, after one or more purchases, the hybrid instant ticket/debit card funds on account will likely be depleted leaving small residual balance of money remaining in the account. One approach for dealing with small residual amounts left in one account is to couple the first account with another debit/credit/gift account. For example, two account numbers 145 can be permitted for one purchase, in order to clear the residual amount out of the first account. However, a preferred method, as depicted in FIG. 20, involves a system that permits the balance on a first account, such as a instant ticket/debit card account to be rolled over to second account. In the context of the combined instant lottery ticket/debit card systems of FIG. 20, this type of balance transfer can be used to encourage the consumer to purchase a new lottery instrument/defined value product such as the instant ticket/debit card 100 when the first funds associated with the debit portion 120 of the card 100 are too small to be readily usable by the consumer.

As shown in FIG. 20, when, for example, the consumer decides the first or extant account associated with the debit card 120 has too low of a balance to make a significant purchase, as indicated at a block 400, he can elect to roll the balance over from the extant card 120 to a new debit card 120 by, first purchasing a new lottery ticket/debit card 100, as shown at a block 405. Then, in this embodiment, the consumer can contact a central database either via a web site, shown at a block 410, or by calling a toll free customer service line shown at a block 415. Here, as indicated by a block 420, the consumer then authenticates that he is the owner of the extant debit card 120 by providing its account number 145 and the associated card security code 150 or alternatively, the optional pseudorandomly generated name 155. After the authentication process is completed, the consumer is provided with the balance available on the extant debit card as indicated at a block 425. The consumer can then, as shown by a block 430, initiate a balance transfer from the extant debit card 120 to the new debit card 120 while providing the new debit card's account number 145 and CID 150 in the process. As shown by a pair of blocks 435 and 440, this embodiment concludes, with the consumer receiving a confirmation at a block 435 and the extant debit card account number 145 is deleted at a block 440 from the central site database at 440.

Figure 21:
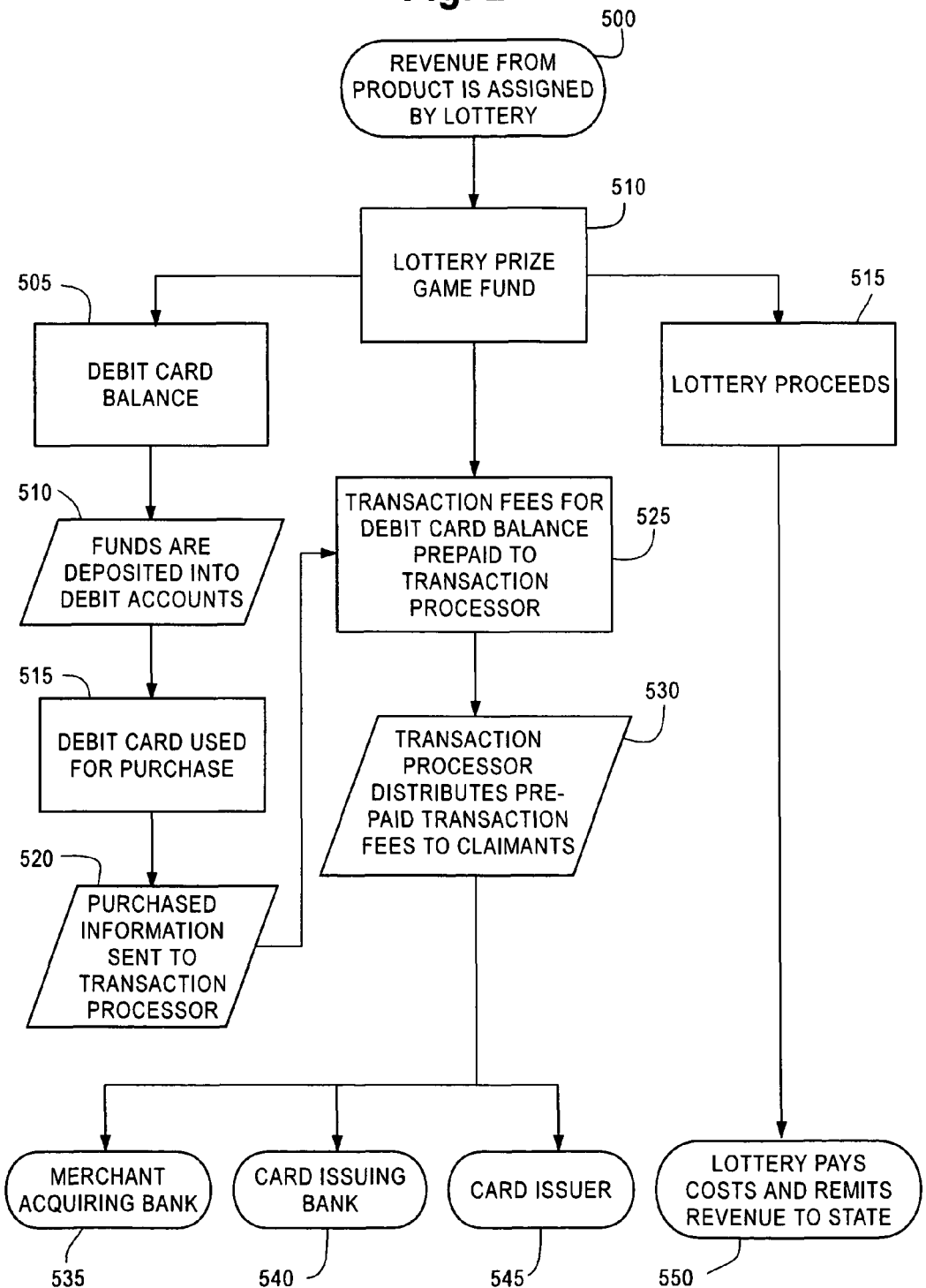
FIG. 21 is a flow chart illustrating examples of cash flows related to cards of the type shown in FIGS. 1-5.

FIG. 21 illustrates one embodiment of a method for distributing cash flows from the types of transactions exemplified in FIGS. 18 and 20. Multiple institutions working together in the above described examples relating to the hybrid instant ticket/debit card 100 can result in a number of funding and cash flow methods. For example, the residual funds left in extant debit cards 120 that are not transferred to a new account can eventually be swept clean via an account maintenance fee. As an example, a 10¢ maintenance fee can be charged for each month the account remains open after a predetermined time such as four months. These maintenance or sweep fees can be channeled as extra profits to the Lottery or can be used to help pay the issuing bank's fees.

A cash flow method of the type shown in FIG. 21 can facilitate the instant ticket/debit card process of FIG. 18 which in turn can be useful in enabling micro and nano payments over the Internet. Here, at least a portion of the lottery revenue, as shown at a block 500, can be used to: fund distributed debit card accounts, indicated at a block 505; fund the standard Lottery prize fund, the fund that usually exists to pay out lottery prizes, indicated at a block 510; and fund the Lottery itself as well as its contractors, indicated at a block 515.

In this embodiment, the funds that are to be deposited into debit card accounts in a block 510 are, preferably, deposited, as shown at 510, only after the hybrid instant ticket/debit cards 100 are actually placed in the retailer location. This can serve to minimize the money required to fund the accounts and in some cases act as a pay as you go type system. It should be noted that many existing lottery infrastructures readily support this type of pay as you go type system with small numbers of tickets organized in packs being distributed to retailers at any one time. When purchases are made with the funded debit cards, as shown at a block 515, the purchase transactions can be set up so as to result in no transaction fees in accordance with the micro/nano payment model of FIG. 18. Then, as shown at a block 520, the transaction information can be transmitted to the Transaction Processor so that the selling entity can receive payment.

Specifically with respect to an embodiment that uses the micro-nano-payment model of FIG. 18, the funds that are allocated for the Lottery Prize Fund shown at 510 can be partially used to fund the prearranged transaction fees, as shown by a block 525, thereby compensating the Transaction Processor. The prepayment of transaction funds at 525 can benefit the Transaction Processor in that it could receive advance payment of transfer fees at a predetermined rate. Then, as indicated at a block 530, the Transaction Processor can use the transaction funds received at 525 to pay a Merchant Acquiring Bank, indicated by a block 535; and a Card Issuing Bank, indicated by a block 540; as well as other card issuing institutions, indicated by a block 545. It should be noted that the Transaction Processor can also arrange to prepay these entities, 535, 540, and 545, or pay one or all with a normal real-time transaction fee model. If the payments were made real-time, a statistical model can be employed by the Transaction Processor at 530 to average out the transaction fees, for example, over a large number of the tickets 100 of the type that are typically sold in large numbers by Lotteries.

Also in this embodiment, any remaining funds, which might include the sweep funds discussed above, can be included in the Lottery proceeds 515 and used, as shown by a block 550, for a variety of purposes including paying its subcontractors and its sponsoring entity as well as covering its own internal costs.

Figure 22:
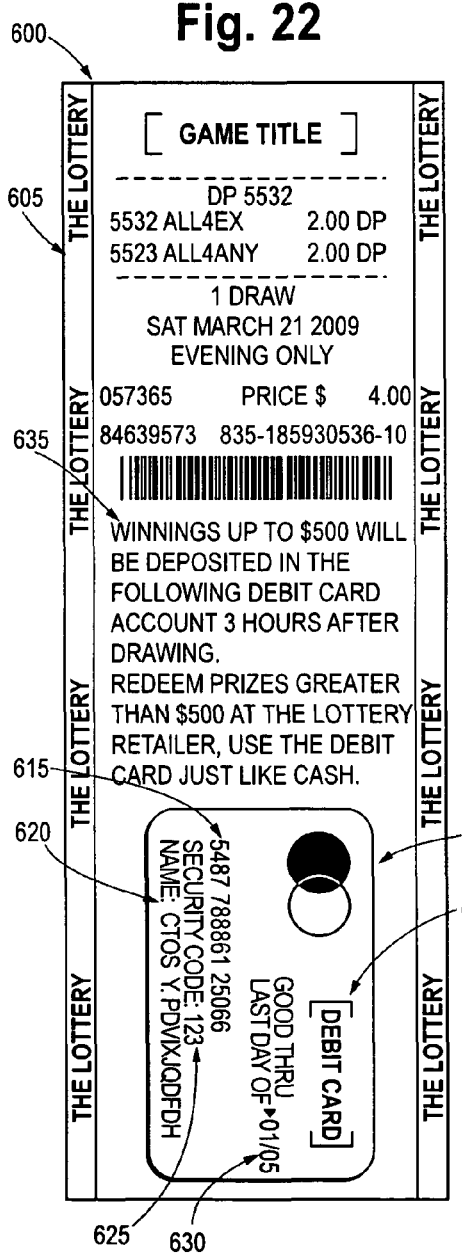
FIG. 22 is a front plan view of an on-line printed lottery receipt type ticket having an integrated debit card as a prize payment mechanism.

FIG. 22 depicts yet another embodiment 600 of a combination of a lottery ticket with a debit or credit card where a debit or credit portion of the ticket 600 can provide a method for payment of a lottery prize. In this example, a lottery ticket portion 605 of the ticket 600 is of an on-line type, which is printed real-time after a bet is made on a future drawing, and a debit card portion 610 is simply printed at the bottom of the same on-line lottery ticket 600. In this embodiment, the debit card portion 610, indicated by a printed indicator at 612 of the ticket 600 is also printed with an account number 615, an optional pseudorandom name 620, an expiration date 630, and a Card ID (CID) 625 which is not covered. The debit card portion 610 of the on-line lottery receipt/ticket 600 would preferably not be active or contain any money in the associated account at the time the bet was made and the ticket 600 printed. In this embodiment, after a drawing associated with the on-line lottery receipt/ticket 600 occurred, winning receipt/tickets would automatically have their associated debit card accounts activated with the winning amount(s) deposited in an account represented by the account number 615. This embodiment has the advantage of eliminating the need for the consumer to return to the retail establishment to collect low and mid tier winnings thereby also relieving the retailer of the requirement to have enough cash on hand to pay out prizes as well as eliminate potential fraud where a retailer informs a consumer that his or her ticket is not a winner, when in fact it is, and keeps the ticket. It is also possible to modify the ticket 600 such that the debit card portion 610 has a defined value to which the winnings, if any, of the lottery portion 605 can be added in the manner of the above described embodiments. In addition, as indicated by a set of instructions at 635, high tier prizes can be provided for by instructing the consumer to redeem the ticket 600 at a lottery retailer.

An alternative to the on-line embodiment 600 illustrated in FIG. 22, is for the debit/credit card portion 610 of the on-line lottery receipt/ticket 600 to only contain partial information required to complete a debit card transaction. In this alternative embodiment, an information element required for redemption, for example the CID 625, is not printed on the ticket 600 when the wager is made. Thus, the consumer might be forced, for example to return to the retailer establishment to obtain a second receipt with the withheld data printed on it. This alternative embodiment has the advantage of still relieving the retailer of the obligation of the requirement to have enough cash on hand to pay out prizes, while maintaining customer traffic through his or her establishment.

In yet another alternative to the on-line embodiment 600 illustrated in FIG. 22, the debit card portion 610 can also be printed with a minimum value such as the $20 minimum card value 182 as depicted in FIG. 1. Thus, this embodiment can be used with the two, previously described, on-line embodiments 600 with the exception that the debit card portion 610 is endowed with a minimum value. Preferably, the consumer would also pay the minimum value 182 as well as the costs of the lottery portion 610 at the time of purchase.

Figure 23:
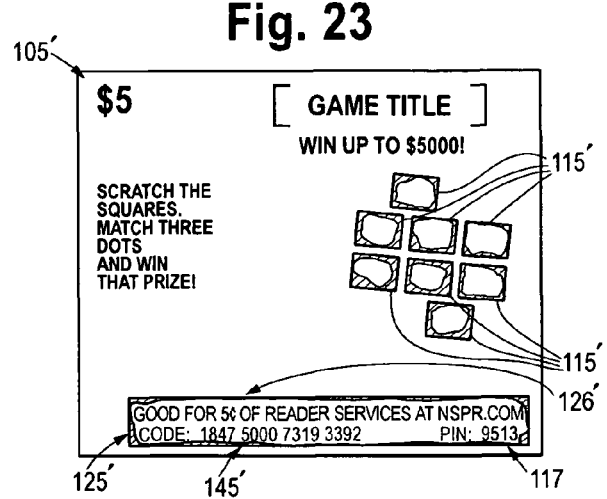
FIG. 23 is a front plan view of a representative example of a losing instant lottery ticket having residual value information printed thereon.
Figure 24:
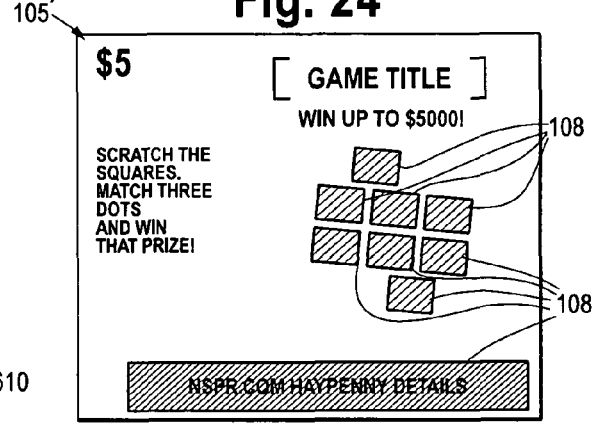
FIG. 24 is a front plan view of the losing instant lottery ticket of FIG. 23 having the residual value information printed covered by a scratch-off coating.

FIGS. 23 and 24 depict another embodiment 105' of the instant lottery ticket 105 described above where residual values can facilitate micro or nano payments. In a first view shown in FIG. 23, the printed lottery ticket 105' includes a set of micro or nano payment information 125' such as a micro or nano payment account number or pay code 145' and a (Personal Identification Number) PIN number 117 along with a set of play indicia 115' indicating that this particular ticket 105' is not a winner, preferably, all of which is concealed under the removable SOC 108 shown in FIG. 24. Included with a set of payment information 125' is an amount 126', in this case 5 cents, to be deposited in an account represented by the number 145'. In this embodiment where only the losing tickets 105' have the payment information 125', the amount 126' can be considered as a residual value of the ticket 105'. In this embodiment, the indicia 115' as well as micro or nano account number 145', the PIN 117, and the amount deposited in the account 126', are obscured by the SOC 108 until the consumer of the product removes it. After removal of the SOC 108, the consumer will have all of the information necessary to use the losing ticket 105' for one or more predetermined micro or nano transactions. In this embodiment, lottery game ticket 105' can be designed, produced, purchased, and played according to current accepted lottery or related business practices. For example, the ticket 105' can be distributed within the existing distribution networks for instant lottery games.

For simplicity, the instant lottery ticket 105' is described as the preferred embodiment for the lottery vehicle, however it will be appreciated that other lottery-type tickets such as on-line tickets printed in real time like the ticket 600 of FIG. 22 can be used and might be more desirable in some applications.

Figure 25:
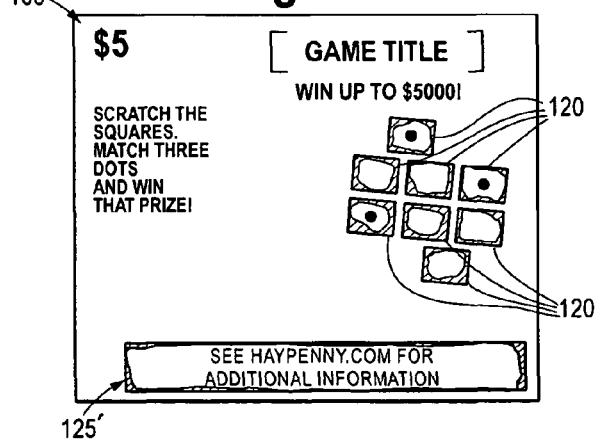
FIG. 25 is a front plan view of a representative example of a winning instant lottery ticket having residual value information printed thereon.

FIG. 25 illustrates an embodiment where the lottery ticket 105' is a winner as indicated by a set of play indicia 120' but also includes the micro or nano payment information 105. In the preferred embodiment, however, winning lottery tickets, identified by winning indicia 115', would preferably not include any micro or nano account information 125'. The primary disadvantage of including micro or nano payments on conventional instant lottery winning tickets, results from the fact that when a consumer surrenders a winning lottery ticket for payment, the lottery ticket 105' effectively becomes a bearer document. This forced surrender of the ticket for payment can create certain logistical challenges. For example, if the consumer did not cash the micro/nano payment before surrendering the ticket 105', the nano or micro value of the ticket 105' can be inadvertently passed on to the cashing retailer. This inadvertent transferring of small value could create ill feelings and other problems with consumers. However, there can be circumstances where it might be desirable to include the residual value 126' with micro or nano account information 145' on winning tickets. For example, if it is determined that printing an uncovered notice on the lottery ticket 105' to the effect that the ticket 105' has a residual value, of for example 5 cents, printing this notice on only losing tickets would make it easy to pick out winners from losers before the ticket is played. In this case it might be desirable to have all of the lottery tickets 105' in a game, winners and losers, include the nano or micro payment information 125'.

One potential advantage of adding a residual value to non-winning lottery tickets 105' of FIGS. 23 and 24, is that it can increase the perceived value of the instant game and lead to increased sales. In addition, there is some potential for the residual value leading to fewer of the tickets 105' thrown out carelessly as litter just as recycling has led to fewer cans and bottles discarded as trash.

In one embodiment, the residual value of the lottery tickets 105' in a game can be set equal to 1% of the price of the ticket 105'. Thus, a one dollar instant ticket 105' would have a residual value of one cent and a twenty-dollar instant ticket 105' would have a residual value of twenty cents. The purchaser of the ticket 105' can then redeem the residual value online through the activation of the account via the account number 145' and the PIN 117. Once the account is activated, the person can then transfer the value to another account. Here, the cost of the residual value of the tickets 105' to the lottery would be a function of the redeemed percentage of the tickets 105'. Thus, the lottery can fund the redeemed residual value of the tickets 105' using the prize funds associated with the instant game. Here, the projected cost to the lottery of the residual value of one of the tickets 105' would be equal to the ticket's residual value multiplied by the redemption percentage. In the example of a one-dollar ticket having a one-cent residual value when redeemed where the actual redemption rate percentage is ten percent, the projected cost to the lottery of the residual value would be one tenth of one cent. Therefore, in some circumstances, funding of the residual value of the tickets 105' by the lottery can be provided out of the prize funds for that game.

One advantage of this approach is the ability to deduct transaction fees from a prize fund and thereby prepay all transaction costs in a manner not apparent to the consumer. As described above, where the lottery BIN 184 is embedded in a credit/debit card account number 145' it can also be used to identify the account as a no fee transaction to the seller. Another embodiment for losing instant or on-line lottery tickets 105' as a source of funding for micro or nano payments is for the losing ticket 105' to include the account numbers 145' that specify micro or nano purchases directly at specific web sites, that is, a closed loop payment system. This embodiment has the added advantage that it can significantly reduce or eliminate infrastructure charges such as credit or debit card fees, thereby allowing in some cases for 100% of the funds to be applied directly to micro or nano purchases. Moreover, the cost of financing losing instant lottery tickets 105' for micro or nano payments as discussed above can be significantly less than the face value 126. Also, the nature of micro and nano transactions on the Internet utilizes technology that has virtually no cost per transaction. One advantage is that this allows for the losing lottery ticket micro or nano funds to be discounted, for example, a transaction that is listed on the Internet as costing 10¢ may in reality only require an 8¢ or 9¢ payment to the merchant.

Once the customer redeems the residual value of the ticket 105' by activating the online account number 145', the residual value(s) can then be spent with participating vendors who accept funds from the online payment accounts. In this embodiment, amounts representing the residual values can be transferred to the bank or other financial institution supporting the online accounts by the lottery or ticket printer. The vendor accepting these payments can in this example receive a share of the payment value.

Another advantage of the losing lottery ticket micro or nano payment system described above is that it can allow the balance from one losing ticket account to be rolled over to another losing ticket account in the manner discussed in connection with FIGS. 20 and 21. This type of balance transfer can be used to encourage the consumer to accumulate losing tickets, much like the old green stamp paradigm of the 1960s.

Figure 26:
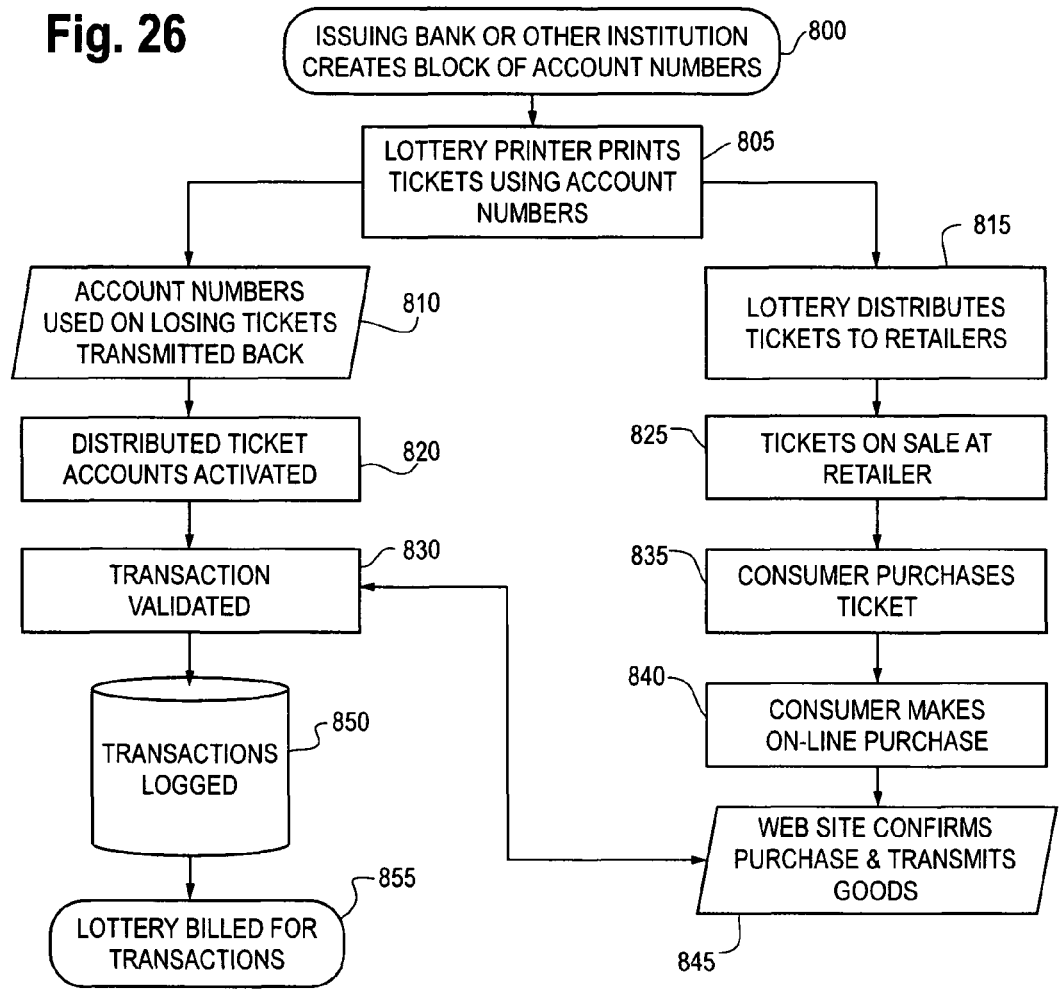
FIG. 26 is a flow chart illustrating a method of producing losing lottery tickets with embedded micro or nano payments shown in FIGS. 23, 24 and 25.

The flowchart provided in FIG. 26 outlines one method of producing losing lottery tickets with embedded micro or nano payments. Beginning at a block 800, the bank or other institution responsible for issuing the micro/nano account numbers 145' would create and transmit a large block of new or unused potential account numbers 145' to the institution responsible for printing lottery tickets. Next, as represented at a block 805, the lottery ticket printing institution would merge the block of account numbers 145' with a set of instant ticket inventory control numbers thereby linking the instant ticket prize values with an associated account number 145'. However, unlike the previously described embodiments, in this embodiment the account numbers 145' would primarily be attached to losing lottery tickets 145'.

As with previous embodiments of the cards 100, it might be desirable that the block contain a larger number of account numbers 145' than the total number of tickets 105' printed to allow for waste in the printing process. After the print run is concluded at 810 and the desired number of tickets 105' are printed, the lottery printing institution, as shown at a block 805, transmits the subset of account numbers 145' actually printed to the issuing bank or other institution. Upon receipt or sometime thereafter, the issuing bank or other institution can activate the account numbers 145' in its database as shown in a block 820.

Next in this example, the tickets 105' are shipped to the retailers as shown at a block 815 with the retailer placing the tickets or a portion thereof on sale 825. As depicted at a block 835 the tickets 105' are purchased by consumers as shown at a block 835 and whereupon the consumer can use the micro/nano accounts numbers 145' to make purchases on the Internet as depicted on a block 840. When the transaction occurs, the receiving web site will in this embodiment verify the micro/nano account represented by the account number 145' by electronically contacting the cognizant bank or institution at a block 845. Assuming the account is valid, the cognizant bank or institution validates the transaction at a block 830, then the web site ships the goods to the consumer as indicated at a block 845. Each validated transaction can then be logged on the cognizant bank or payment institution's database at a block 850 and when a sufficient number of transactions have occurred, the cognizant bank or payment institution can bill the lottery or designated party for the actual micro/nano payments used in the transactions.

FIGS. 27, 28, 29, and 30 illustrate examples of another embodiment of the type of hybrid product 100 described above that, in this case, relates to a closed payment system. This is in contrast to an open payment system such as the above described credit or debit card approach that permits the bearer of the defined value portion 120 to make purchases from a wide variety of vendors and institutions. In a closed payment system as used herein the prize component or defined value portion can be configured such that redemption is limited to a predetermined or specified institution or vendor. Preferably, the prize component will be limited to a single institution or vendor but in some circumstances it might be desirable to add a limited number of other vendors to the prize component.

Figure 27:
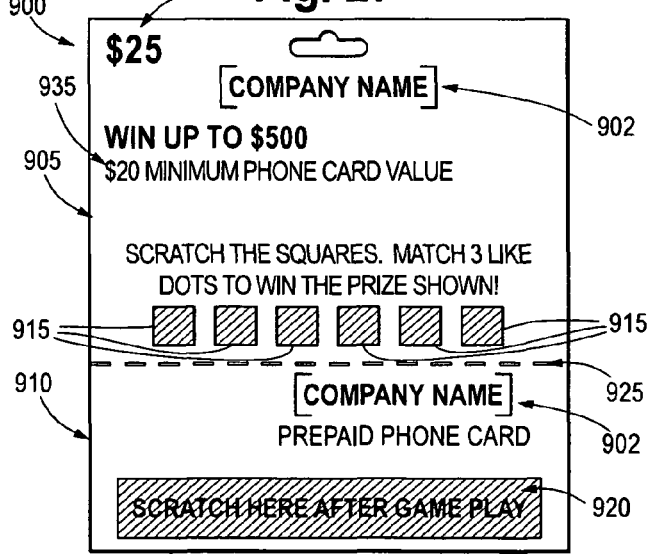
FIG. 27 is a front plan view of a first representative example of a combination instant lottery ticket payment card for use with a closed payment system.

As shown in FIG. 27, one example of a closed payment hybrid product is a printed card 900 that includes a lottery ticket portion 905 as well as a closed payment portion 910. Here, the prize component 910 is a prepaid card that can be used with a specified vendor identified at 902 on the card 900 such as a telephone company to make telephone calls. As in previous embodiments, the closed payment hybrid product includes a removable scratch-off-coating SOC 915 of the type that normally covers printed instant lottery indicia such as a set of play indicia 916 of the type shown in FIG. 28. Also, a SOC 920 in this embodiment covers certain information printed on the closed payment card portion 910 of the type shown in FIG. 28 including: a card account code 921 and a credit amount 922. In this embodiment, the SOC 920 preferably obscures the information 921 and 922 until the purchaser of the product removes it. Thus, the closed payment card 910 can be attached to or integrated with the instant lottery game ticket 905 and further it can be designed, produced, purchased, and played according to current accepted instant lottery business practices. As with the card 100, the hybrid instant ticket/closed payment card 900 can be distributed within existing distribution networks for instant lottery games as well as establishments typically honoring the close payment gift cards such as, coffee shops, retail stores, etc. In addition, the closed payment card 910 can contain other information such as a barcoded account number 923 as shown in FIG. 29. In any case, the closed payment redemption information can be configured to supply the consumer with all of the information necessary to use the card 910 for a closed payment card transaction with the vendor identified at 902. Also, as with the card 100, a perforation 925 can be added to the card 900 to aid the consumer in separating the closed payment card portion 910 from the scratch-off lottery ticket portion 905 after the instant ticket has been played. Alternatively, the closed payment card can be manufactured out of plastic and attached to the lottery portion via glue for example.

In these embodiments, the price of the instant ticket/closed payment card 900 as shown printed at 930 on the upper left hand corners of the lottery ticket portions 905 includes the price of the lottery instant game on portion 905 and at least a minimum value printed at 935 of the closed payment portion 910.

As an example, the $20 closed payment card 910 bundled with a $5 instant game ticket 905 can be sold for a total of $25 as shown at 930. If the lottery ticket 905 is a winner as shown in FIG. 29 by the play indicia 916, the closed payment card account balance is the prize value shown at 922, here $520, rather than the $20 minimum. Alternatively, the amount won on the instant ticket 905 can be added to the guaranteed minimum 935 of the closed payment card 910, $70 in the example illustrated in FIG. 28.

FIG. 30 illustrates an example where the instant lottery ticket 905 is not a winner. In this embodiment, the closed payment card 910 still has the minimum value of $20 printed at 935 and depicted at 922 under the SOC 915. One advantage of the cards 900 shown in FIGS. 27-30 and in particular the non winning lottery ticket 905 in FIG. 30 is that the economics of a lottery game can permit the transaction fees associated with redeeming the closed payment card 910 to be covered by the non-prize component of the lottery game revenue. More generally, the economics of the lottery game, including the prize structure and the non-prize component of the lottery game revenue, are preferably arranged such that the typical costs of the lottery game as well as the transaction and administrative costs of the closed payment cards 910 are covered. Alternatively, the economics of a closed loop payment system can permit the costs of the lottery game to be covered in the base cost of the card 900, that is for example, a $20 closed loop gift card can cover the costs of adding a $1 lottery ticket portion at no extra costs.

In a preferred mode of operation, at the time the instant ticket/closed payment card 900 is purchased by a consumer, the closed payment card account number 921 is activated in a central database of the specified vendor 902 or associated payment institution and the funds become available for use by the closed payment cardholder to make purchases from the vendor 902.

Figure 31:
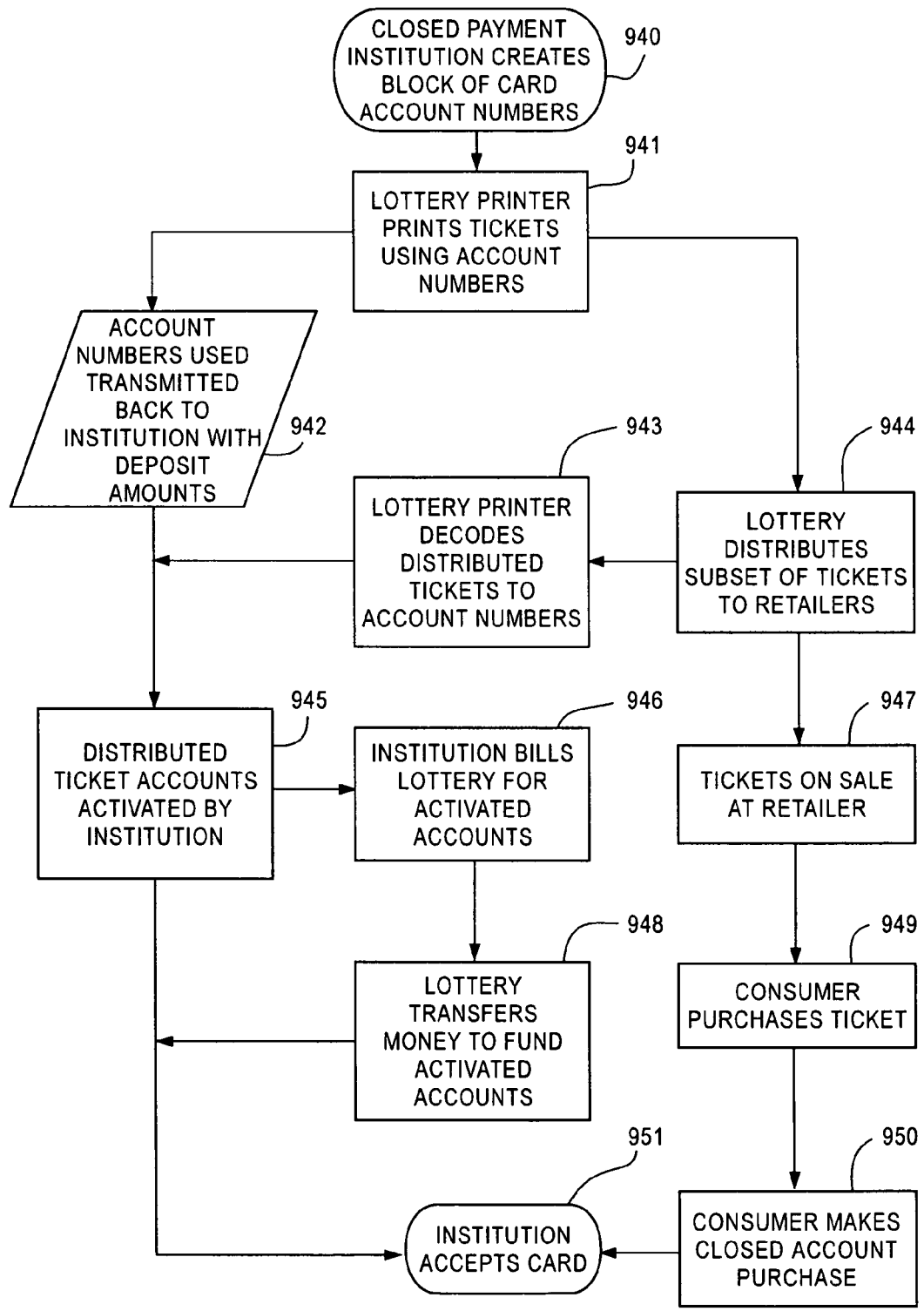
FIG. 31 is a flow chart illustrating a first method of producing, distributing, selling and using the hybrid instant ticket/closed payment card of the type shown in FIGS. 27, 28, 29 and 30.

FIG. 31 illustrates a first method of producing and selling hybrid instant ticket/closed payment card of the type 900. In this case it is the hybrid instant ticket/closed payment card 900 that can be distributed within an existing distribution network already in place for instant lottery games. This example also illustrates one embodiment of a mechanism for organizing the closed payment account numbers 921 and synchronizing deposits with the designated vendor 902 or payment institution.

Beginning at a block 940, the institution, such as the vendor 922, responsible for issuing the closed payment card account numbers 921 creates and transmits a large block of the account numbers 921 to the institution responsible for printing the cards 900. Next, as represented at a block 941, the card printing institution merges the block of account numbers 921 with a set instant ticket inventory control numbers that can be the type contained in the barcodes 165, thereby linking the instant ticket prize values with an associated account number 921.

As with the cards 100, the block can contain a larger number of account numbers 921 than the total number of tickets 900 so as to allow for waste that typically occurs during the printing process. Therefore in this embodiment, after the print run is concluded at a block 941 and the desired number of cards 900 are printed, the lottery printing institution, as shown at 941 will transmit as shown at a block 942 the subset of account numbers 921 actually printed along with the associated credit to be deposited with each account number 921 to the issuing institution.

Next in this example, as shown at a block 944, the lottery printing organization then physically ships the printed tickets to the lottery's warehouse for distribution to the retailer or other designated outlets. When the tickets are shipped to the retailers, or, when the retailers activate packs of the tickets 900, here assuming pack activation is logged by the lottery, the lottery transmits the listing of all shipped/activated instant ticket inventory control numbers as shown at a block 943 to the lottery ticket printing institution. The lottery ticket printing institution then can link the inventory control numbers 165 to the printed set of closed payment account numbers 921 as shown at a block 943 using a secure algorithm typically used for this purpose in the instant lottery industry. It is also desirable to ensure that the set of account numbers 941 associated with the inventory control numbers 165 is maintained in a secure fashion to maintain security against pick-outs. As depicted at a block 943 the resulting list of account numbers 921 is then transmitted to the issuing institution for activation at that time or later at the time of sale of the cards 900.

Preferably, as shown at a block 945, upon receipt of the account numbers to be activated, the institution invoices the lottery 946 for the necessary funds to be deposited into the card accounts. Alternatively, the institution can invoice the lottery ticket printing institution for transfer of funds. Still another possibility is for the lottery to deposit all funds for all accounts at one time. This method has the advantage of fewer interactions, but with the disadvantage of moving a large sum of money at one time. In any case, the funds are preferably deposited when the accounts are activated as indicated at a block 948. It should be noted that since the funds are applied to a closed payment system, a substantial discount can be realized between the printed values 922 of the closed payment cards 910 and the actual funds transferred to the institution. This is possible because the closed payment funds can only be spent at the specified vendor(s) 902 and therefore these institutions can keep the normal credit card like transaction fees as well as improve its cash flow by holding the closed payment funds until the consumer makes a purchase.

At this point in the example of FIG. 31, as illustrated by a block 947, the retailers place the received tickets on sale and after which consumers, as shown at a block 947, purchase the card 900. Then the consumer scratches off the SOC 920 and reads the amount 922 deposited on the closed payment card 910 as well as the account number 921 and any other identifying information. The consumer can then use this information to execute transactions as shown at a block 950, which are approved by the issuing institution 951.

Figure 32:
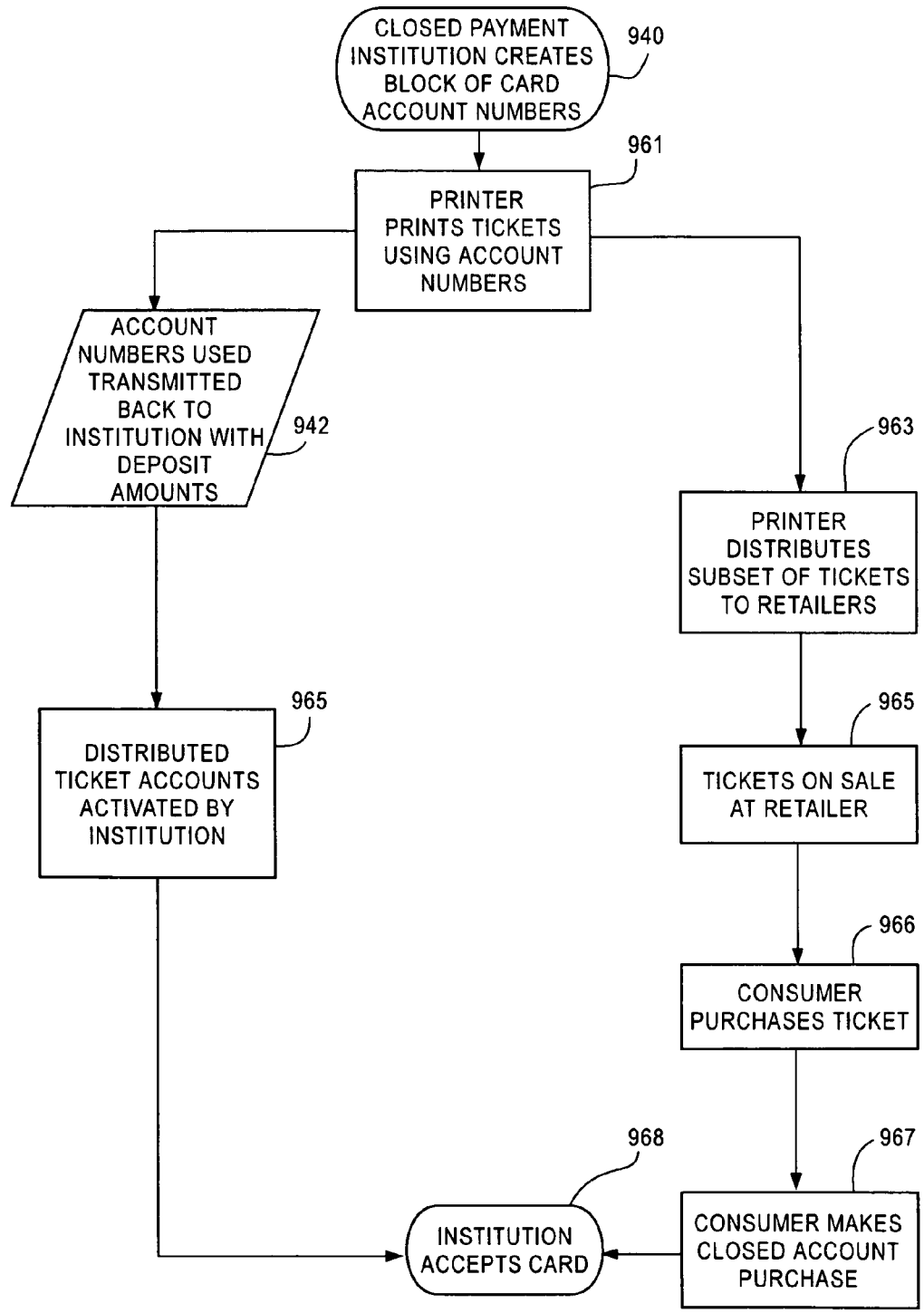
FIG. 32 is a flow chart illustrating a second method of producing, distributing, selling and using the hybrid instant ticket/closed payment card of the type shown in FIGS. 27, 28, 29 and 30.

FIG. 32 illustrates an alternative method of producing and selling hybrid instant ticket/closed payment cards of the type 900 without the participation of a lottery institution. In this case the hybrid instant ticket/closed payment card 900 are distributed within an existing distribution network. FIG. 32 includes an embodiment of a mechanism for organizing the account numbers 921 and synchronizing deposits with the closed payment institution for this alternative method. Beginning at a block 960, the institution responsible for issuing the closed payment card account numbers 921 creates and transmits a large block of the closed payment card account numbers 921 to the institution responsible for printing the tickets. Next, as represented at a block 961, the ticket printing institution merges the block of closed payment card account numbers 921 with a set of instant ticket inventory control numbers 165, thereby linking the instant ticket prize values with an associated account number 921.

As with the method of FIG. 31, the block can contain a larger number of closed payment card account numbers 921 than the total number of tickets 900. Therefore in this embodiment, after the print run is concluded at 961 and the desired number of cards 900 is printed, the printing institution, as shown at block 961 transmits the subset of account numbers 921 actually printed along with the associated credit to be deposited with each account number 921 to the issuing institution as shown at a block 962.

Next in this example, as shown at a block 963, the printing organization then physically ships the printed tickets to a warehouse for distribution to the retailer base. Again, it is desirable to ensure that the set of account numbers 921 associated with inventory control numbers 165 is maintained in a secure fashion to maintain security against pick-outs. As depicted at a block 962 the resulting list of account numbers 921 is then transmitted to the issuing institution for activation 964.

At this point in the example of FIG. 32, as shown at a block 965, the retailers place the received tickets on sale and after which consumers, as shown at a block 966, purchase or otherwise acquire the hybrid instant ticket/closed payment cards 900. The consumer then scratches off the SOC 920 and reads the amount 922 deposited on the closed payment card 910 as well as the account number 921 and any other identifying information. The consumer can then use this information to execute transactions shown at a block 967, which then can be approved by the issuing institution as shown at a block 968.

We claim:

1. A method of making combination lottery ticket and defined value cards comprising:
    obtaining a set of defined value card account numbers; and
    manufacturing a set of combination lottery ticket defined value cards where at least a portion of said cards include a lottery portion having a prize value and at least a portion of said cards include a defined value portion having a predetermined nano or micro value independent of said prize value of said lottery portion of the card and applying to at least a portion of the cards one of said account numbers where said lottery ticket portion of the card having a prize value is linked to the account number printed on that card and wherein a prize fund associated with said lottery portion of the cards is sufficient to cover the redemption costs of said nano or micro values.

2. The method of claim 1 wherein the cards having said lottery portion having a winning prize value do not have said nano or micro values.

3. The method of claim 1 including the steps of:
    shipping at least a portion of the cards to retailers for activation;
    recording the sale of at least a portion of said cards that have been activated by a retailer to a consumer; and
    accepting redemption by said consumer of said nano or micro value of said cards sold that do not have said winning prize value.

4. The method of claim 1 including applying to at least a portion of said account numbers a lottery BIN number identifying said account numbers as a participating lottery account and loading at least one session of a set of winning lottery amounts into a set of lottery accounts identified by said account numbers.

5. The method of claim 1 including the step of:
    utilizing said BIN numbers for authenticating the age or location of purchasers of the cards.

6. The method of claim 1 wherein said step of manufacturing said set of cards includes configuring said lottery portions and said defined value portions of said cards on a plastic substrate and applying said account numbers to said plastic substrate.

7. The method of claim 1 wherein said step of manufacturing said set of cards includes printing said lottery portions and said defined value portions of said cards on a paper substrate and applying said account numbers to said paper substrate.

* * * * *